(12) United States Patent
Takimoto et al.

(10) Patent No.: US 6,626,459 B2
(45) Date of Patent: Sep. 30, 2003

(54) AIR BAG FOR STEERING WHEEL

(75) Inventors: Masahiro Takimoto, Aichi-ken (JP); Hiroyuki Kobayashi, Aichi-ken (JP); Tadashi Yamamoto, Aichi-ken (JP); Toru Koyama, Aichi-ken (JP); Kenji Mori, Aichi-ken (JP); Yuji Sato, Aichi-ken (JP); Naoki Hotta, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 64 days.

(21) Appl. No.: 09/792,081

(22) Filed: Feb. 26, 2001

(65) Prior Publication Data
US 2001/0028162 A1 Oct. 11, 2001

(30) Foreign Application Priority Data

| Mar. 31, 2000 | (JP) | ................................ | 2000-098339 |
| Mar. 31, 2000 | (JP) | ................................ | 2000-098379 |
| May 17, 2000 | (JP) | ................................ | 2000-144790 |
| May 19, 2000 | (JP) | ................................ | 2000-147757 |

(51) Int. Cl.$^7$ .................................................. B60R 21/16
(52) U.S. Cl. ........................................ 280/731; 280/736
(58) Field of Search .......................... 280/728.1, 730.2, 280/731, 736

(56) References Cited

U.S. PATENT DOCUMENTS

| 6,059,311 A | * | 5/2000 | Wipasuramonton et al. ..... 280/729 |
| 6,170,857 B1 | * | 1/2001 | Okada et al. ............. 280/728.1 |
| 6,231,069 B1 | * | 5/2001 | Yokoyama ................ 280/730.2 |
| 6,241,283 B1 | * | 6/2001 | Zarazua .................... 280/743.2 |
| 6,270,113 B1 | * | 8/2001 | Wipasuramonton et al. ..... 280/730.2 |

FOREIGN PATENT DOCUMENTS

| GB | 2323569 | 9/1998 |
| GB | 2331049 | 5/1999 |
| JP | 1-132444 | 5/1989 |
| JP | 1-311930 | 12/1989 |
| JP | 2-74440 | 3/1990 |
| JP | 2-283545 | 11/1990 |
| JP | 4-9349 | 1/1992 |
| JP | 5-155300 | 6/1993 |
| JP | 8-104196 | 4/1996 |
| JP | 9-30353 | 2/1997 |
| JP | 2631300 | 4/1997 |
| JP | 9-118185 | 5/1997 |
| JP | 2677937 | 7/1997 |
| JP | 9-183358 | 7/1997 |
| JP | 9-220995 | 8/1997 |
| JP | 10-100838 | 4/1998 |
| JP | 10-152009 | 6/1998 |
| WO | WO97/36768 | 10/1997 |

* cited by examiner

Primary Examiner—Lesley D. Morris
Assistant Examiner—L. Lum
(74) Attorney, Agent, or Firm—Posz & Bethards, PLC

(57) ABSTRACT

An air bag mounted in an automotive steering wheel and having a bag body and flow regulation fabric mounted within the bag body. The bag body includes a front panel and a rear panel and is a horizontally symmetrical, planar bag body. The front panel is provided with a gas inlet port. The flow regulation fabric branches from the gas inlet port into radially extending right and left passages that run to the outer fringes of the bag body. Circumferentially extending passages of the flow regulation fabric extend from the front ends of the radially extending passages along the fringes of the bag body vertically, and are each provided with upper and lower opening ends at which gas can be ejected toward the vertical centerline of the bag body. Upon expansion, the air bag quickly enters between the occupant's abdomen and the rim of the steering wheel.

3 Claims, 31 Drawing Sheets

AIR BAG FOR STEERING WHEEL

CROSS REFERENCE TO RELATED APPLICATIONS

This application claims the benefit of and priority from Japanese Application No. 2000-098339 filed Mar. 31, 2000, No. 2000-098379 filed Mar. 31, 2000, No. 2000-144790 filed May 17, 2000, and No. 2000-147757 filed May 19, 2000, the contents of each of which are incorporated by reference.

BACKGROUND OF THE INVENTION

1. Field of the Invention

The present invention relates to an air bag mounted in an automotive steering wheel and, more particularly, to an air bag which is mounted in an automotive steering wheel and is excellent in the ability to enter between the driver or a car occupant and the steering wheel during the initial phase of inflation of the air bag.

2. Description of Related Art

In order to protect a car occupant properly by an air bag system installed in the steering wheel, the air bag must be quickly inflated during the initial phase, i.e., immediately after the air bag springs out of the bag exit port. Also, the bag needs to enter between the steering wheel and the car occupant quickly. In FIGS. 1 and 2, the steering wheel of a vehicle is indicated by 12 and has an annular rim 16. The distance between the bottom portion of the annular rim 16 of the steering wheel 12 and the abdomen of the torso 14 of the occupant is indicated by L1. This distance L1 is normally smaller than the distance L2 between the top portion of the annular rim 16 and the abdomen and than the distance L3 between each side portion of the annular rim 16 and the abdomen. Therefore, during initial phase of inflation, the entry of the bag into the space between the abdomen of the occupant and the annular portion tends to be hindered. Especially, where the occupant sets the seat in a forward position, this tendency is greater.

To permit the air bag to enter between the occupant's abdomen and the rim easily, various techniques using flow regulation means such as flow regulation fabric have been proposed, as disclosed in Japanese Patent Laid-Open Nos. 311930/1989, 104196/1996, 30353/1997, 118185/1997, 220995/1997, 100838/1998, 152009/1998, Japanese Patent No. 2677937, International Patent Laid-Open WO97-36768, and British Patent GB-2331049-A.

These techniques using flow regulation fabric fundamentally consist of placing an upper piece of flow regulation fabric and a lower piece of flow regulation fabric to cover the surface of an inflator that is opposite to the rear panel of the inflator such that flow of gas ejected from the inflator is guided circumferentially of the air bag. However, the gas ejected from the inflator flows principally horizontally. Also, the gas flows vertically along the right and left fringes of the flow regulation fabric, i.e., parallel to the vertical centerline of the air bag. As a result, the flow directed toward the center (centerline) of the occupant's abdomen weakens.

In the prior art technique employing the flow regulation fabric, the feature that the distance (gap) between the occupant's abdomen and the rim of the steering wheel is small is combined with the feature that the flow of gas directed toward the vertical centerline of the steering wheel is weak to thereby weaken the movement of the air bag toward the vertical centerline of the steering wheel during inflation of the air bag. Especially, the motion of the air bag entering between the occupant's abdomen and the rim of the steering wheel has been weak.

SUMMARY OF THE INVENTION

It is an object of the present invention to provide an air bag which is mounted in an automotive steering wheel and which can quickly enter between the rim of the steering wheel and the occupant's abdomen during inflation of the air bag without increasing the load applied to the occupant's torso from the air bag.

The air bag which is mounted in an automotive steering wheel and built in accordance with the present invention has gas guide channels therein to permit the air bag to inflate quickly vertical to the plane of the air bag (i.e., within a plane perpendicular to the direction of ejection of the gas). The gas guide channels also cause the air bag to inflate quickly between the steering wheel and the occupant along the center axis of the plane. The body of the air bag normally assumes a substantially circular form in a plane, and comprises a front panel having a gas inlet port and a rear panel opposite to the gas inlet port.

In one embodiment of the air bag, the gas guide channels are formed by flow regulation fabric mounted within the body of the bag. The gas guide channels have a pair of right and left radial flow passages for guiding the expanding gas entering from the gas inlet port to the right and left radially until the gas reaches the fringes of the body of the bag. Also, the gas guide channels have a pair of right and left peripheral flow passages for guiding the gas along the fringes of the bag body to the position at which the gas can flow out toward the vertical centerline of the air bag.

As a result, the gas flow that goes out of the right and left circumferentially extending channels moves toward the vertical centerline of the air bag. This allows the air bag to quickly enter between the steering steel and the occupant from both sides.

In an air bag in accordance with another embodiment of the present invention, the gas guide channels are formed by inflation guide cylinders having base portions facing the gas inlet port. The inflation guide cylinders have projected gas passage portions that will become gas inlet ports into the bag body after letting in gas before the gas flows into the bag body.

The expanding gas flowing into the inflation guide cylinders from the gas inlet portion of the air bag inflates the air bag laterally, i.e., vertical to the direction of ejection of the gas. This is referred to as the primary inflation. The air bag is inflated preferentially in the given direction, i.e., vertical to the direction of ejection of the gas. Subsequently, the expanded gas flows into the bag body from the projected gas passage portions of the inflation guide cylinders. The body of the bag is inflated between the occupant and the interfering body to thereby protect the occupant. This is referred to as the secondary inflation.

In an air bag in accordance with a further embodiment, flow passages that guide the flow of the expanded gas from the gas inlet port to the right and left obliquely downwardly of the central horizontal axis of the gas inlet port are created by flow regulation fabric.

The velocity vector of the primary stream of the gas contains a downward component and a horizontal component. Therefore, the bag is inflated toward both sides of the occupant's torso. This is referred to as the primary inflation. At this time, the load is not directly applied to the occupant's abdomen. Subsequently to the primary flow of the gas directed to the right and left downwardly, a secondary flow of the gas directed from both sides toward the vertical centerline is created. Consequently, the bag quickly enters between the rim of the steering wheel and the occupant's abdomen from both sides.

In an air bag in accordance with still another embodiment of the invention, the body of the air bag has a lower portion provided with radially extending channels extending to the outer fringes. These radially extending channels are formed by dividing a joining portion that joins together front and rear panel portions.

The provision of the joining portion in the lower portion makes the set amount of stroke (the amount of thickness achieved by inflation) and set volume of the lower portion smaller than those of the higher portion. When expanded gas enters the air bag, the radially extending channels expand into hollow cylinders quickly. Therefore, the lower portion of the air bag quickly inflates and enters between the occupant's abdomen and the steering wheel. However, the thickness is small. The expanded gas strikes the upper peripheral walls of the joining portion and are reflected. Consequently, the upper portion also inflates quickly. Accordingly, during inflation of the bag, the load applied to the occupant's torso from the bag is not increased. In spite of this, the bag can quickly enter between the rim of the steering wheel and the occupant's abdomen.

Other objects and features of the invention will appear in the course of the description thereof, which follows.

DESCRIPTION OF THE PREFERRED EMBODIMENTS

First Embodiment

Figure 3:
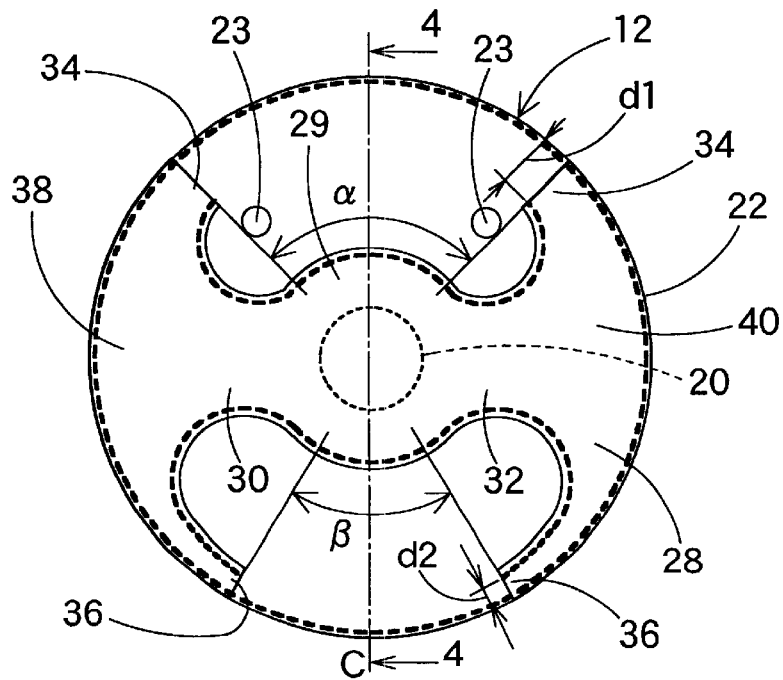
FIG. 3 is a plan view of an air bag in accordance with a first embodiment of the present invention as viewed from inside the front panel of the bag.

In FIG. 3, an air bag 12 in accordance with a first embodiment of the present invention is mounted in an air bag system A mounted in an automotive steering wheel. The air bag 12 assumes a substantially circular contour in a plane when it is fully inflated, as viewed from the car occupant side. Unless stated otherwise, the vertical direction, the lateral direction, and longitudinal direction are taken from the occupant side. The air bag 12 comprises a bag body 26 and flow regulation fabric 28 placed inside the bag body 26. The bag body 26 has a front panel 22 and a rear panel 24 located opposite to the front panel 22. The front panel 22 is provided with a gas inlet port 20 through which an inflator 21 is mounted. The flow regulation fabric 28 is placed opposite to the gas inlet port 20 within the bag body 26.

The flow regulation fabric 28 forms a pair of radially extending channels 30, 32 and a pair of circumferentially extending channels 38, 40. The gas inlet port 20 branches into the radially extending left channel 30 and the radially extending right channel 32, which in turn extend to the outer fringes of the bag body 26 that are normally the front panel 22. The circumferentially extending left channel 38 and the circumferentially extending right channel 40 extend from the front ends of the radially extending channels 30 and 32, respectively, along the fringes of the bag body 26 vertically, and are provided with upper and lower opening ends 34 and 36, respectively, at positions from which gas can flow out toward the vertical centerline C of the bag body 26. The total capacity of the radially extending channels 30, 32 and the circumferentially extending channels 38, 40 differs according to the inflation characteristics that the bag body 26 is required to exhibit. Normally, the total capacity is set to $\frac{1}{50}$ to $\frac{1}{5}$ of the total capacity of the bag body 26 on completion of inflation. If the total channel capacity is too small, a resistance to the gas flow is created in the channels, and the flow rate of gas flowing into the bag body 26 decreases. As a result, the top and bottom portions of the bag body 26 corresponding to the head and abdomen of the occupant, respectively, may be inflated with a delay. Conversely, if the total capacity of the channel is too large, the gas stays in the circumferentially extending channels 38 and 40 for a prolonged time. It will take a longer time for the gas to flow into the bag body 26. Again, the top and bottom portions of the bag body 26 corresponding to the occupant's head and abdomen, respectively, will be inflated with a delay.

The upper opening ends 34 subtend an angle of $\alpha$ about the vertical centerline C. The lower opening ends 36 subtend an angle of $\beta$ about the vertical centerline C. These angles $\alpha$ and $\beta$ are set to 120° to 30°, preferably 90° to 60°. Especially, in order to cause the bag to enter between the occupant's abdomen and the rim more effectively, the angle $\beta$ at the lower position is set smaller than the angle $\alpha$ at the higher position. If these angles $\alpha$ and $\beta$ (especially $\beta$) is too large, the action (vector) of the gas stream going from the upper and lower opening ends 34, 36 toward the vertical centerline C weakens. As a result, the advantages (especially, increasing the reliability of the operation for urging the bag into the space between the occupant's abdomen and the rim of the steering wheel) of the present invention may not be derived sufficiently.

In the illustrated example, the radially extending left channel 30 and the radially extending right channel 32 extend horizontally. These radially extending channels 30 and 32 may also be arranged like the letter "V". That is, the distance from each end (branching portion) of the radially extending channels 30 and 32 to the lower opening ends 36 is shorter than the distance from each end of the radially extending channels to the upper opening ends 34. In this case, it is expected that the lower portion of the bag body 26 will be inflated more quickly than the upper portion, causing the bag to enter between the occupant's abdomen and the rim of the steering wheel quickly. At this time, the subtended angles are 60° to 180°.

In the present embodiment, the flow regulation fabric 28 is placed opposite to the gas inlet port 20, thus forming an inner bag 29 to eject the air bag quickly.

Figure 4:
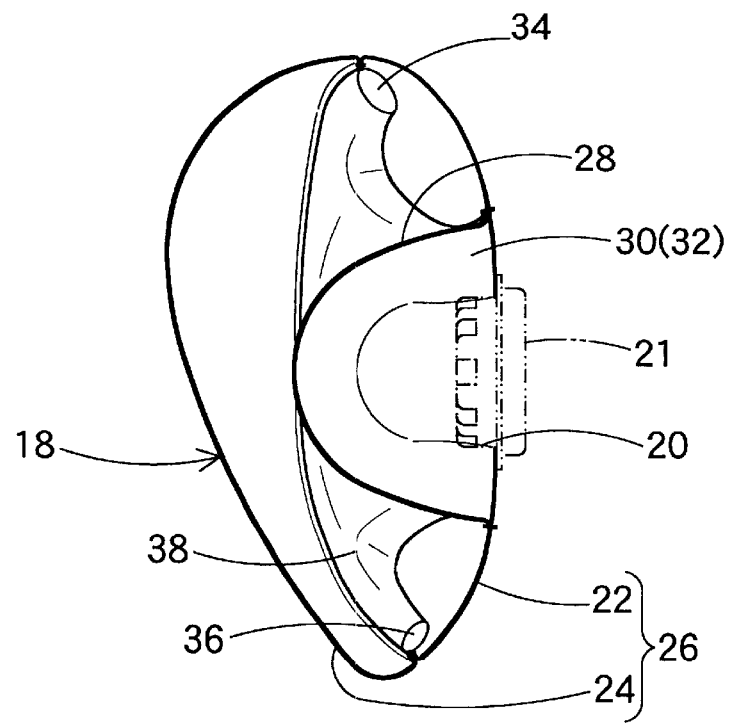
FIG. 4 is a cross-sectional view taken on line 4—4 of FIG. 3, or the vertical centerline, and in which the air bag has been inflated.

In the present embodiment, the front and rear panels 22 and 24, respectively, are so shaped that the upper portion of the bag body 26 becomes thicker in vertical cross section than the lower portion during inflation of the bag as shown in FIG. 4. In the illustrated example, the shapes of the front and rear panels 22 and 24, respectively, are set. Since they inflate to thicknesses corresponding to the distances between the occupant's torso 14 and the upper and lower portions of the rim 16, the resistance created when the bag enters between the occupant's torso 14 and the rim 16 decreases. Hence, the bag easily enters between the occupant's abdomen 14a and the rim 16.

Figure 5:
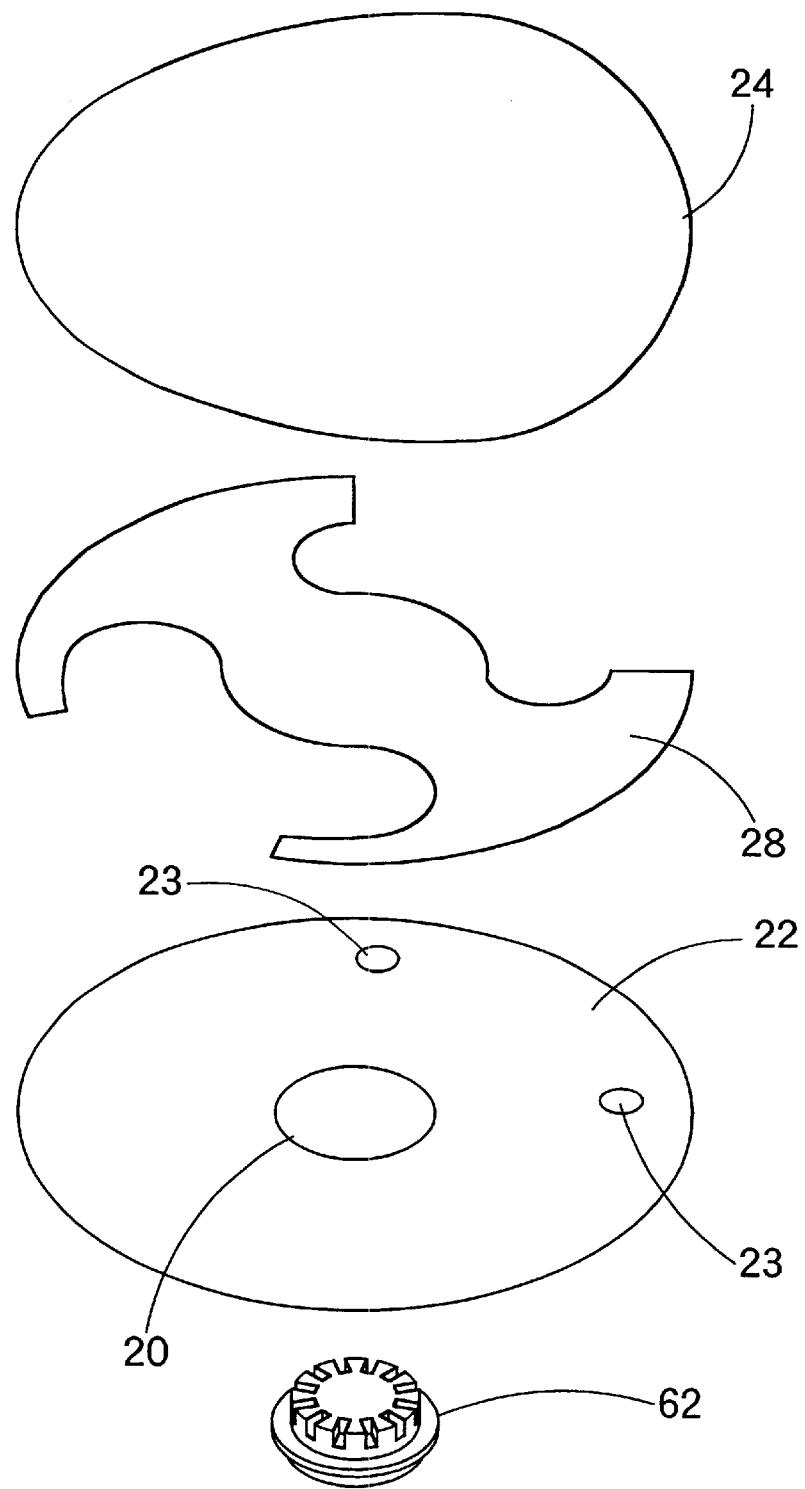
FIG. 5 is an exploded perspective view of the air bag shown in FIG. 3, and in which an inflator is also shown.

The manner in which the upper portion of the inflated air bag is made wider than the lower portion may assume various forms. For instance, the rear panel 24 may be widened upward as shown in FIG. 5. The gas inlet port 20 may be shifted downward from the center position. Furthermore, a beltlike panel having a widened central portion and tapering toward its front end may be placed between the front panel 22 and the rear panel 24 such that the central portion is on the upper side.

The diameter d1 of the upper opening 34 is set greater than the diameter d2 of the opening at the bottom opening 36. This facilitates securing the amount of expanding gas corresponding to the capacity of expansion of the upper and lower portions of the air bag body 26. The inflation of the air bag body 26 is made smoother. At this time, the ratio of the diameter of the top opening to the diameter of the bottom opening is d1/d2=3/1 to 1/1.

The air bag 18 in accordance with the present embodiment is fabricated by preparing woven cloth normally made of polyester or nylon threads, cutting the cloth into the shapes of the panels 22, 24, and 28, and sewing them together (see FIG. 5). The bag may also be fabricated by bonding, French seaming, or other methods. The panels may also consist of woven cloth coated with rubber.

That is, as shown in FIG. 3 or 5, the flow regulation fabric 28 comprises the curved H-shaped panel 28 directly sewn to the front panel 22 provided with the gas inlet port 20 to form the left and right channels 30, 32 extending radially and the left and right channels 38, 40 extending circumferentially.

The air bag body 26 is fabricated by sewing together the front panel 22 on the bottom side (to which the flow regulation panel 28 has been sewn) and the rear panel 24 on the ceiling side such that the surfaces forming the inner surface are caused to face outwardly and then turning the sewn panels inside out. Normally, the front panel 22 is provided with one or more gas vent holes 23. In the illustrated example, two vent holes spaced from each other horizontally are formed. Usually, at least one piece of annular reinforcing fabric (not shown) is sewn to the fringes of the gas inlet port 20 and to the fringes of the gas vent holes 23 to reinforce them.

Figure 6:
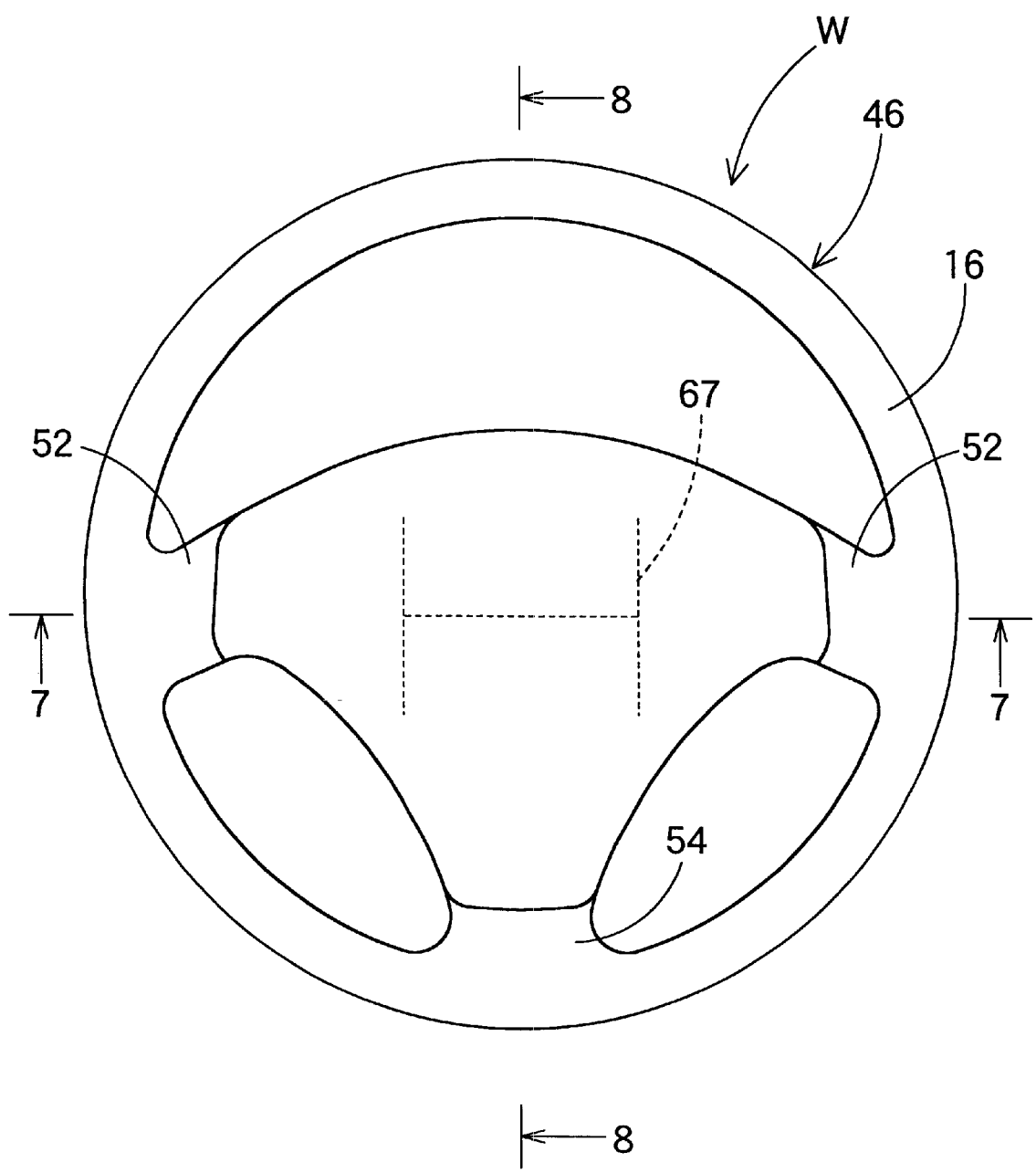
FIG. 6 is a plan view of one example of steering wheel incorporating the air bag in accordance with the first embodiment.

The air bag in accordance with the first embodiment is used in the manner described below. The air bag system A mounted in the steering wheel uses the air bag described above and is mounted in a steering wheel body 46 having three spokes as shown in FIG. 6. The steering wheel body can also have four or two spokes.

The steering wheel body 46 comprises a rim 16 gripped by the driver during steering, a boss 50 connected to a steering shaft (not shown), and three spokes 52, 54 connecting the boss 50 to the rim 16. The spokes 52, 54 extend horizontally and downwardly.

Figure 7:
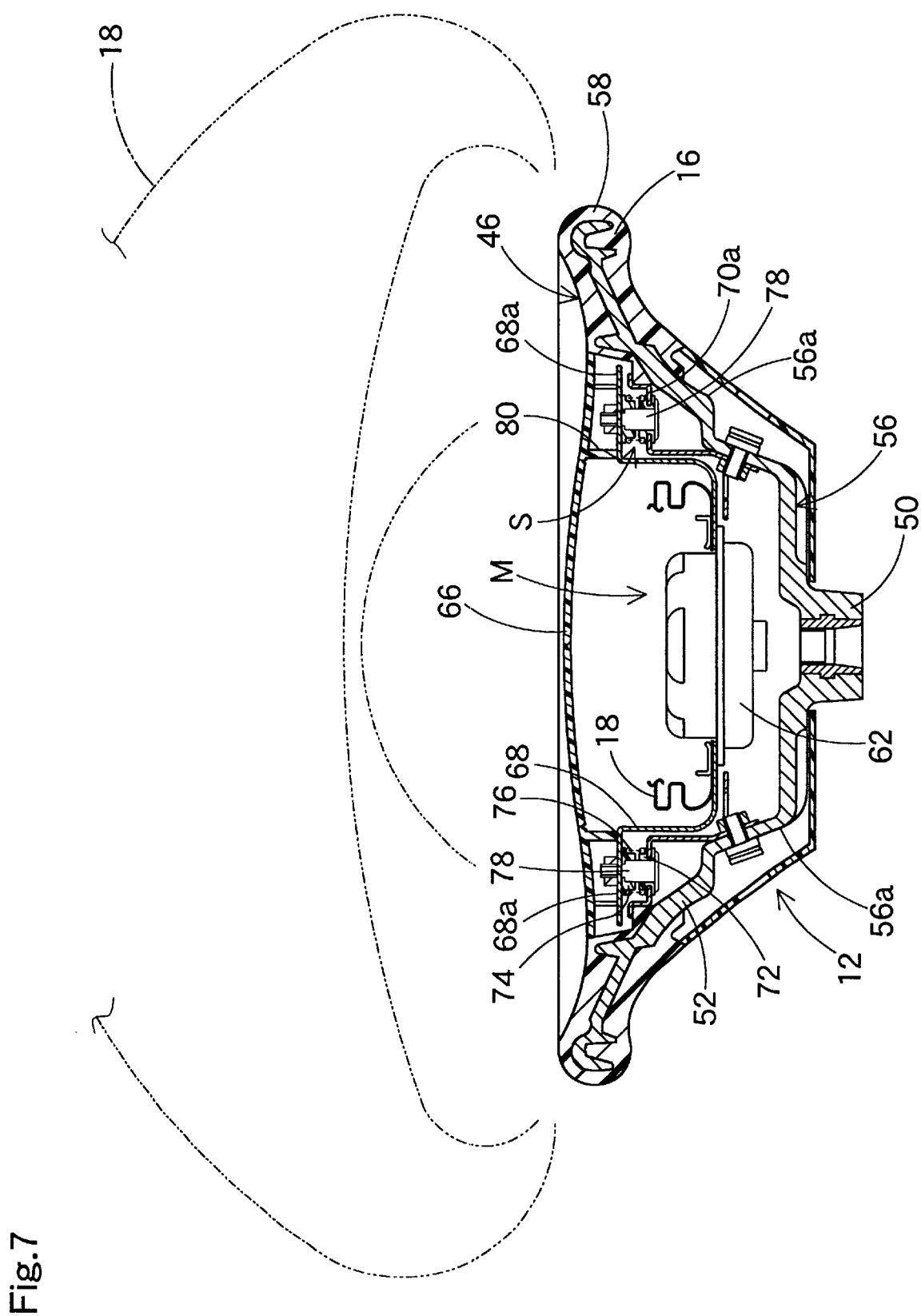
FIG. 7 is a schematic cross section taken on line 7—7 of FIG. 6.
Figure 8:
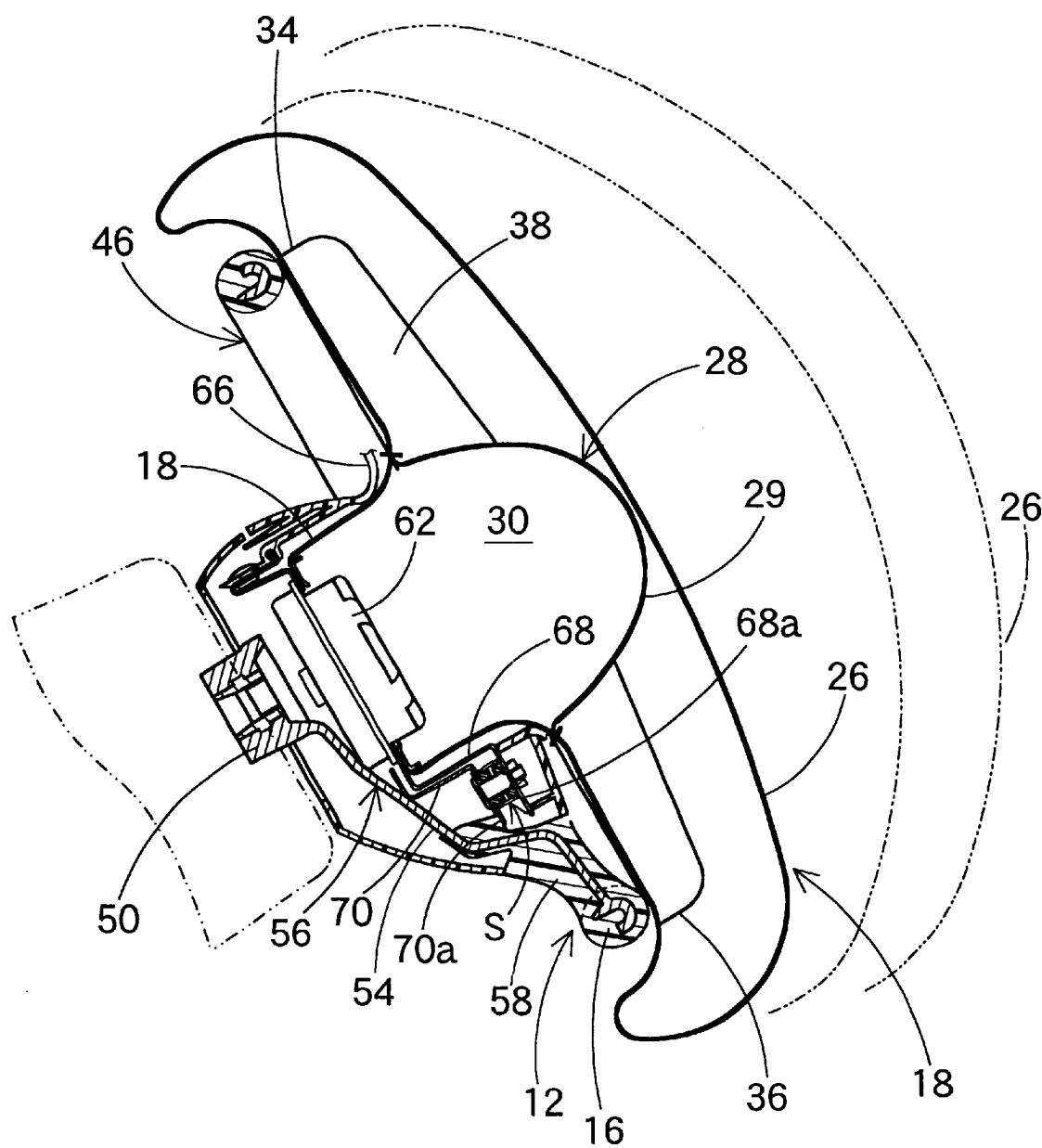
FIG. 8 is a schematic cross section taken on line 8—8 of FIG. 6, showing the manner in which the air bag is inflated during its operation.

The steering wheel body 46 is fabricated by coating a wheel core 56 with a molded coating portion 58 made of a synthetic resin such as polyurethane. The wheel core 56 is die cast from aluminum or the like. The air bag system A and a horn switching device S are incorporated in the steering wheel body 46 (see FIGS. 7 and 8). This is outlined below.

The air bag system A comprises an inflator 62, the air bag 18, and a pad cover 66 coupled together via an air bag system casing 68 having a mounting flange 68a. The air bag system A is mounted by supporting it at three points by placing the horn switching device S between a support plate 70 and the mounting flange 68a of the casing 68. The support plate 70 is screwed to spoke cores 56a of the wheel core 56. A fixed contact 72 is firmly affixed to the support flange 70a, while a movable contact 74 is rigidly mounted to the mounting flange 68a. The switching device S has a coil spring 76 placed between the fixed contact 72 and the movable contact 74 and is of a well-known construction. Therefore, detailed description of this switching device S is omitted herein. A guide post (stepped bolt) 78 moves the movable contact vertically. Also shown are pressure ribs 80.

The steering wheel W in which the air bag system and so on are mounted in this way is mounted in the steering system via the steering shaft (not shown) and thus mounted in the vehicle.

The output signal from a sensor (not shown) that detects an impact load is applied to the inflator 62. The expanded gas ejected from the inflator 62 flows into the air bag 18 through the gas inlet port 20. Then, the inner bag 29 formed in the center of the flow regulation panel 28 expands, tearing up an H-shaped tear line 67 in the pad cover 66. Thus, an air ejection port is formed. Then, the air bag 18 is ejected from the casing 68 of the system and inflated.

In the air bag 18 in accordance with the present embodiment, the presence of the flow regulation panel 28 placed inside the bag body 26 creates the following gas stream. The expanded gas first swells the radially extending left and right channels 30 and 32, respectively, formed by the flow regulation panel 28, is ejected to the right and left of the bag, and collides against the fringes of the bag body 26. Then, the gas is separated into upper and lower streams along the fringes of the bag body 26 by the circumferentially extending left channel 38 and the circumferentially extending right channel 40 and flows out from both upper opening end 34 and lower opening end 36. Since these top opening end 34 and the bottom opening end 36 are so located that the streams of the gas are directed toward the vertical centerline C of the bag body 26, the direction of expansion of the bag toward the vertical centerline of the steering wheel W is directed toward the vertical center of the steering wheel W.

Therefore, the air bag in the gap between the rim 16 and the occupant's torso 14 quickly inflates on the side of the abdomen 14a of the occupant's torso 14 and on the side of the head 14b. At this time, the gas flow has a vector directed toward the centerline though the distance between the bottom of the rim 6 and the abdomen 14a of the occupant's torso at the position of the vertical centerline C is shorter than the distances at other positions. Therefore, the air bag 18 in the gap between the rim 16 and the occupant's torso 14 can quickly enter between the occupant's abdomen 14a and the rim 16. In the present embodiment, the upper portion of the bag body 26 inflates to a greater thickness than the lower portion and so, if the occupant's torso 14 is close to the bottom of the rim 16, the bag body 26 does not swell much. Consequently, the resistance to the entry is small. This smoothes the entry of the air bag 18 into the space between the occupant's abdomen 14a and the rim 16 owing to the inflation.

Second Embodiment

Figure 9A:
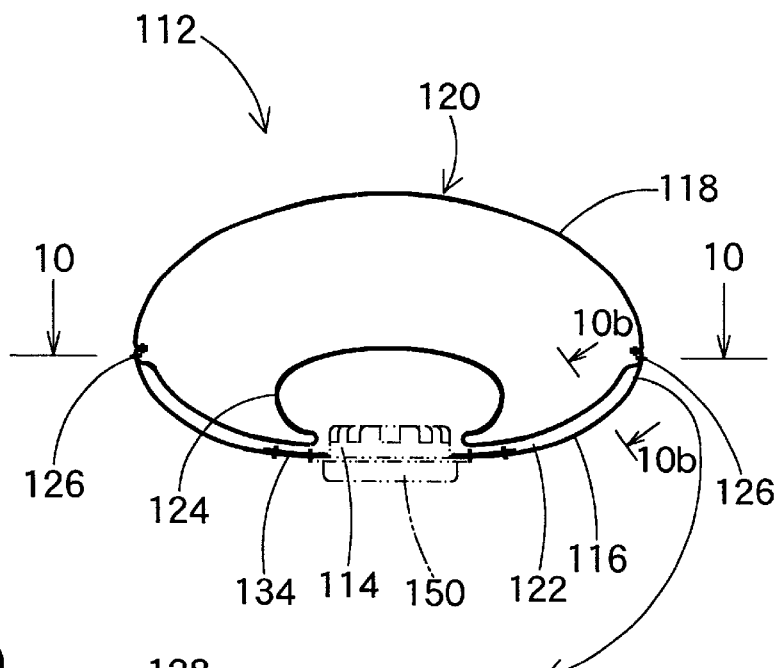
FIG. 9(a) is a schematic cross section of an air bag in accordance with a second embodiment of the invention.
Figure 9B:
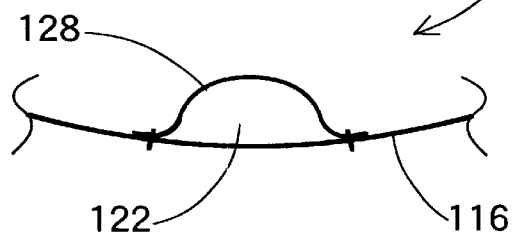
FIG. 9(b) is an end view taken on line b—b through inflation guide cylinders shown in FIG. 9(a)
Figure 10:
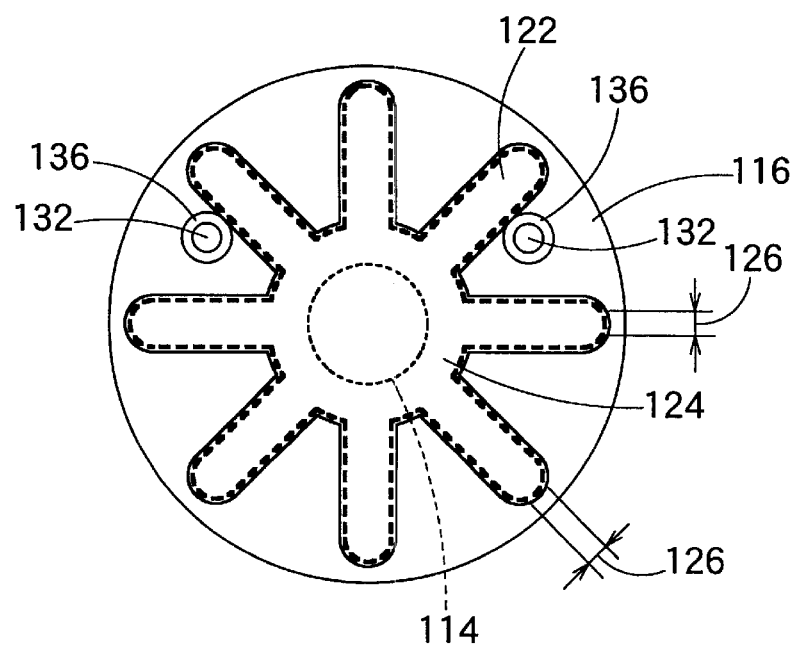
FIG. 10 is a schematic cross section taken on line 10—10 of FIG. 9(a)

An air bag built in accordance with a second embodiment of the present invention and mounted in an automotive steering wheel is next described by referring to FIGS. 9(a), 9(b) and 10. The air bag, generally indicated by reference numeral 112, has a gas inlet port (gas inlet portion) 114, and essentially consists of a bag body 120 and inflation guide cylinders 122 having their respective base portions located opposite to the gas inlet port 114 within the bag body 120. This bag body 120 is fabricated from pieces of fabric 116 and 118.

The air bag 112 in accordance with the present invention can have a double structure, it being noted that this is not an essential structure. That is, it is equipped with an inner bag 124 facing the gas inlet port 114 within the bag body 120. This promotes the inflation of the bag cover on the ceiling side of the air bag at the beginning of the inflation of the air bag.

The inflation guide cylinders 122 are provided with projected gas passage portions 126 that will form gas passages from the inflation guide cylinders 122 to the bag body 120 after the expanded gas flows into the inflation guide cylinders 122 before the gas flows into the bag body 120.

In the present embodiment, the inflation guide cylinders 122 are formed partially of the inner bag 124. Instead, plural inflation guide cylinders 122 may be formed independently of the inner bag 124.

In the air bag for the driver on the driver's seat, the air bag 112 is required to quickly inflate radially of the air bag 112, i.e., in a direction vertical to the direction of ejection of the gas from the inflator. Therefore, as shown in FIGS. 10–12(b), the air bag includes two or more radially extending inflation guide cylinders 122.

Figure 11A:
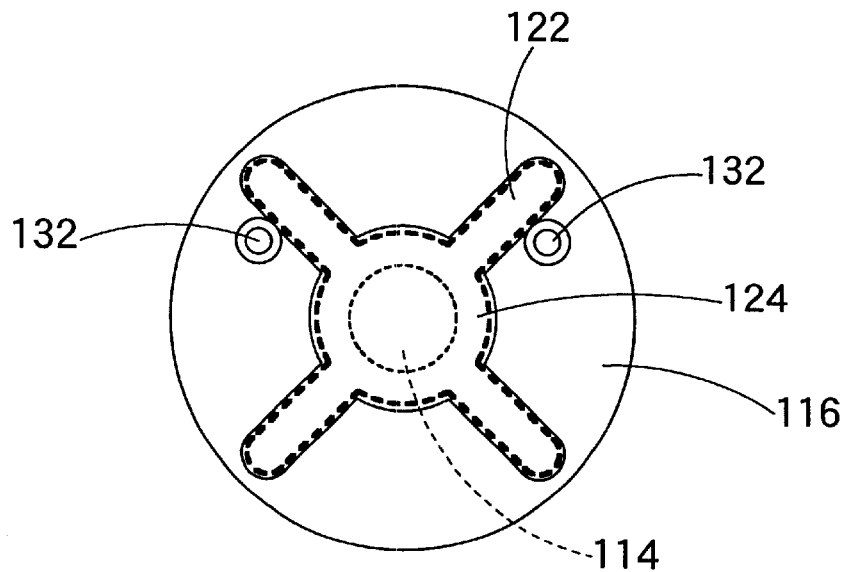
FIGS. 11(a) and 11(b) are schematic cross sections of air bags in accordance with further embodiments of the invention, each of the air bags being equipped with four guide cylinders.
Figure 11B:
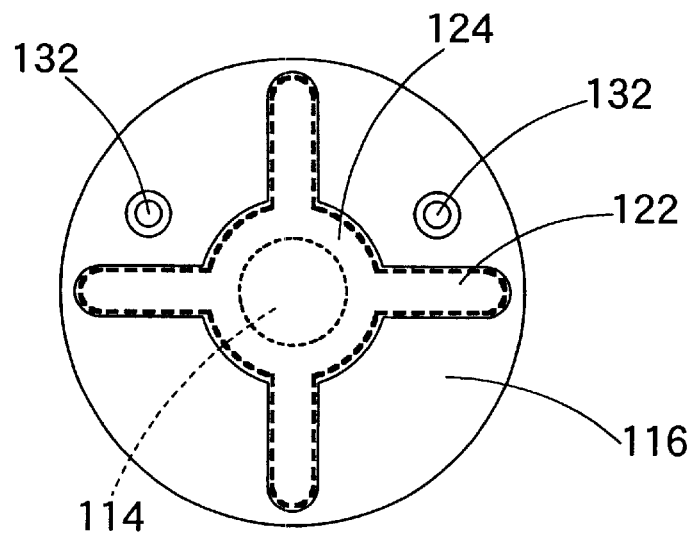
Figure 12A:
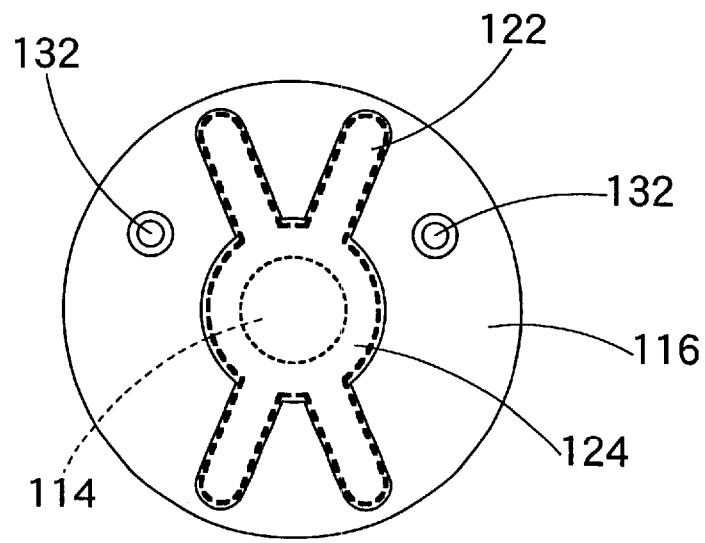
FIGS. 12(a) and 12(b) are schematic cross sections of air bags in accordance with still other embodiments of the invention, and in which guide cylinders are closely placed vertically or horizontally and downwardly.
Figure 12B:
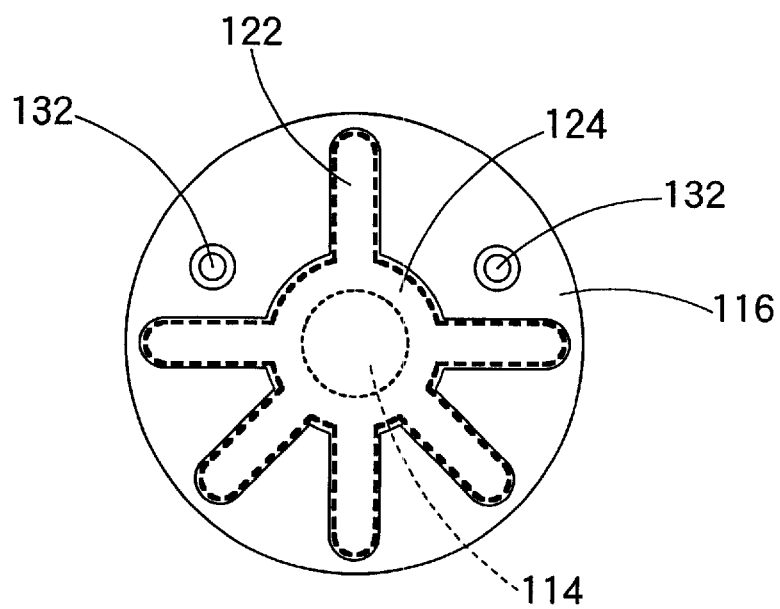

Normally, the number of the inflation guide cylinders 122 is eight and they are equally spaced from each other as shown in FIG. 10. The number of the inflation guide cylinders may be four as shown in FIGS. 11(a) and 11(b). Also, the number may be six. Where there is a desired lateral direction along which the bag should be inflated during an initial phase, e.g., when it is in a horizontal direction, inflation guide cylinders 122 are closely mounted vertically as shown in FIG. 12(a) Where the direction is horizontal and downward, inflation guide cylinders 122 are closely arranged in these directions as shown in FIG. 12(b). Furthermore, according to a required inflation performance, the inflation guide cylinders may have different lengths.

Usually, the projected gas passage portions 126 that will form gas passages are formed at the front ends of the cylinders 122. If the projected gas passage portions 126 are in intermediate portions, the inflation guide cylinders 122 will form gas passage ports before the inflation. If so, the gas may expand toward the ceiling side of the air bag 112, or toward the occupant. That is, if the projected gas passage portions 126 are at the front ends, it is assured that the projected gas passage portions 126 in the inflation guide cylinders 122 are opened. Furthermore, the gas is ejected radially. Consequently, the aforementioned drawbacks would be prevented.

In the present embodiment, the projected gas passage portions that will form gas passages are formed by the fragile joint portions (tear seams) 126 that are torn up by a given gas pressure and form gas passage ports. In the illustrated example, the tear seams are formed using weak sewing thread. The tear seams may be formed by any desired method such as bonding or French seaming.

The ratio of the diameter of the cross section of each inflation guide cylinder 122 to the length of each tear seam 126 is 1/1 to 1/5. If the ratio is small, the flow of gas into the bag body 120 via the inflation guide cylinders 122 is suppressed. This may lower the speed of the secondary inflation.

The air bag 112 in accordance with the present embodiment is fabricated normally by cutting woven fabric of thread of polyester or nylon into pieces of desired shapes and then sewing together these pieces of fabric. The air bag may also be fabricated by bonding or French seaming. The panels may be made of fabric coated with rubber.

Figure 13:
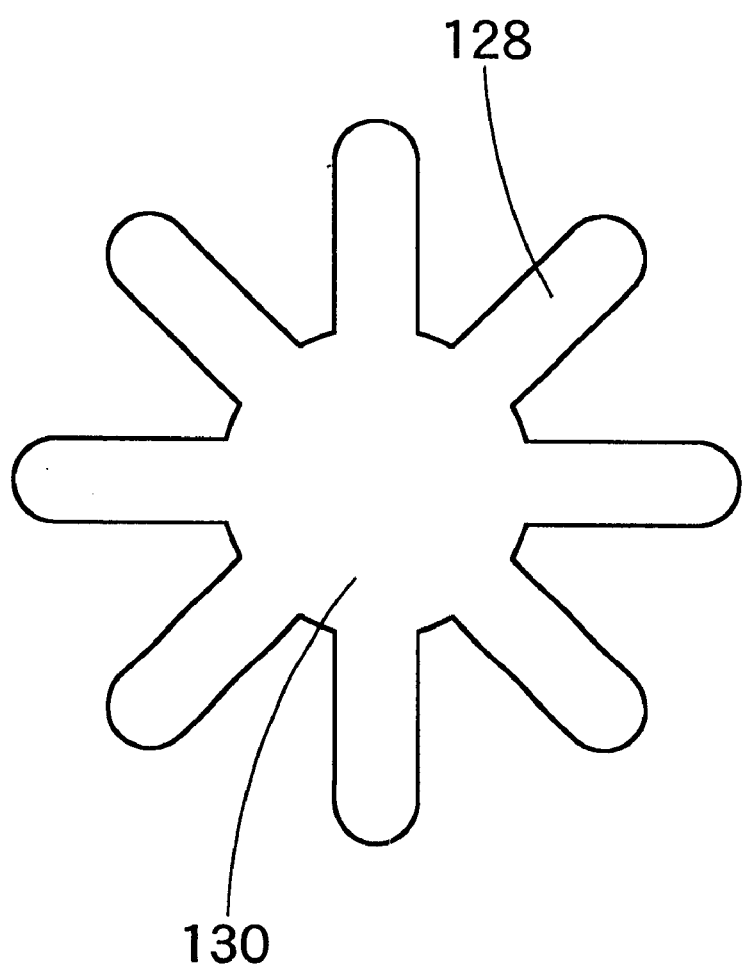
FIG. 13 is a plan view of one panel forming an inner bag and guide cylinders shown in FIG. 9.

In the illustrated example, the inner bag 124 is fabricated by preparing a one-piece cylindrical panel 130 having plural stripes 128 forming inflation guide cylinders as shown in FIG. 13, wrinkling the panel, and then sewing the panel while the diameter is reduced.

The bag body 120 is fabricated by sewing together the front panel 116 on the bottom side provided with the gas inlet port 114 and the rear panel 118 on the ceiling side such that the surfaces forming inner surfaces are caused to face outward and then turning the sewn panels inside out. The front panel 116 is normally provided with one or more gas vent holes 132. In the illustrated example, two gas vent holes horizontally spaced apart from each other are formed. The fringes of the gas inlet port 114 and of the gas vent holes 132 are reinforced by sewing first and second annular reinforcing pieces of fabric 134 and 136, respectively, to the fringes.

The inflation guide cylinders 122 are fabricated, as shown in FIG. 9(*b*), by directly sewing the strips 128 to the front panel 116 such that a part of the horizontal cross section of each inflation guide cylinder 122 is formed by the panel 116 that makes the bag body 120. Alternatively, the cylinders 122 may be previously formed and sewn to the front panel by appropriate means such as sewing or use of tethers.

The capacity of the channels in the inflation guide cylinders 122 differs according to the inflation characteristics that the air is required to exhibit. Usually, the capacity is set to ⅕₀ to ⅒ of the capacity of the bag body on completion of the inflation. If the capacity of the channels in the inflation guide cylinders compared with the capacity on completion of the inflation is too large, the time in which the bag settles into the given shape during the initial inflation process owing to the inflation guide cylinders 122 may become too long. If the channel capacity is too small, the bag may not settle into the given shape during the initial inflation process.

Figure 14:
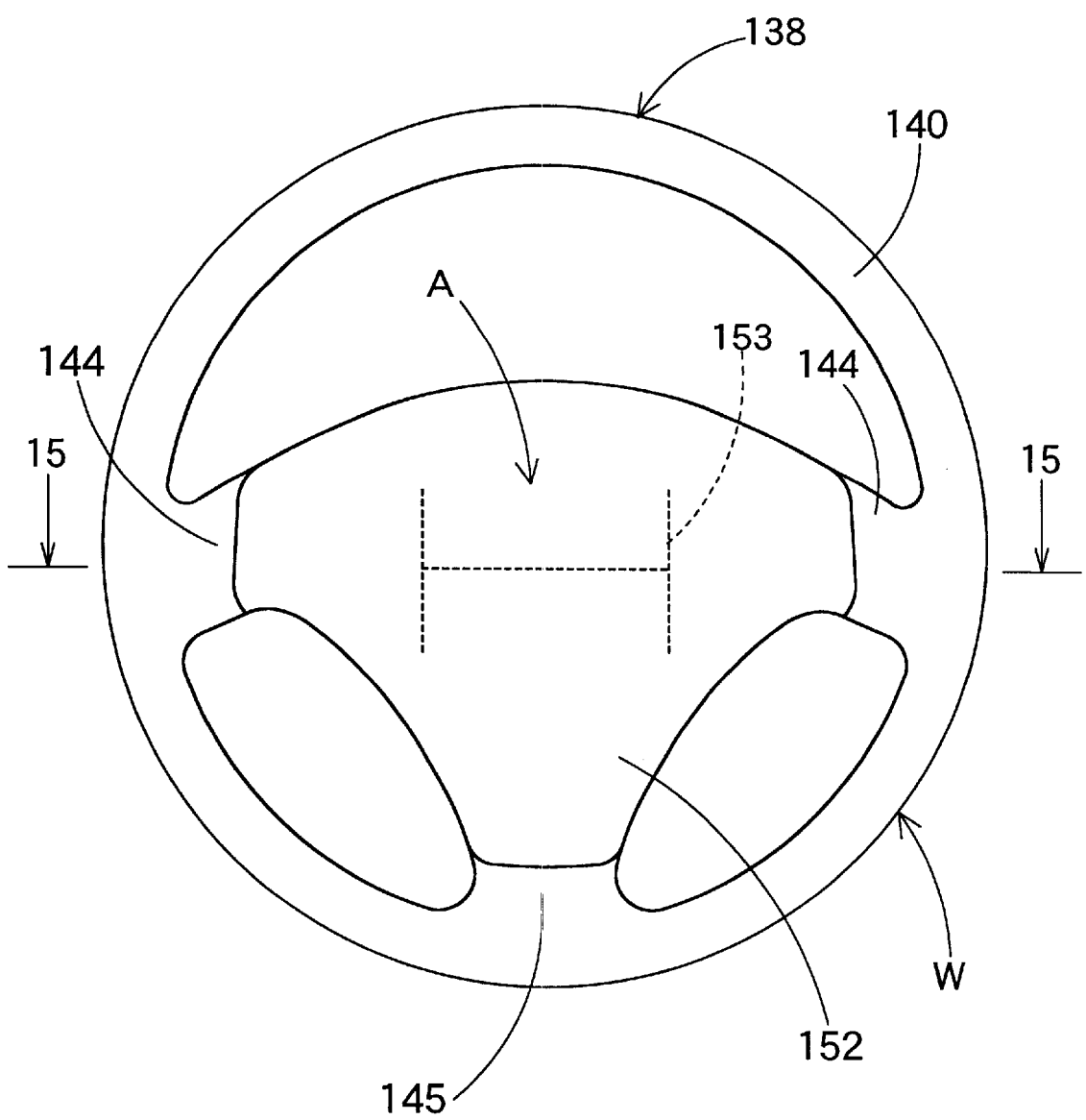
FIG. 14 is a plan view of a steering wheel system incorporating an air bag in accordance with the second embodiment.

The manner in which the air bag in accordance with the present embodiment is used is next described. The air bag system A which is used for the driver on the driver's seat and which uses the above-described air bag is mounted to the body 138 of a three-spoke steering wheel as shown in FIG. 14.

The body 138 of the steering wheel comprises a rim 140 gripped by the driver during steering, a boss 142 connected to the steering shaft (not shown), and three spokes 144, 144, and 145 extending horizontally and downwardly. The spokes connect the boss 142 to the rim 140.

Figure 15:
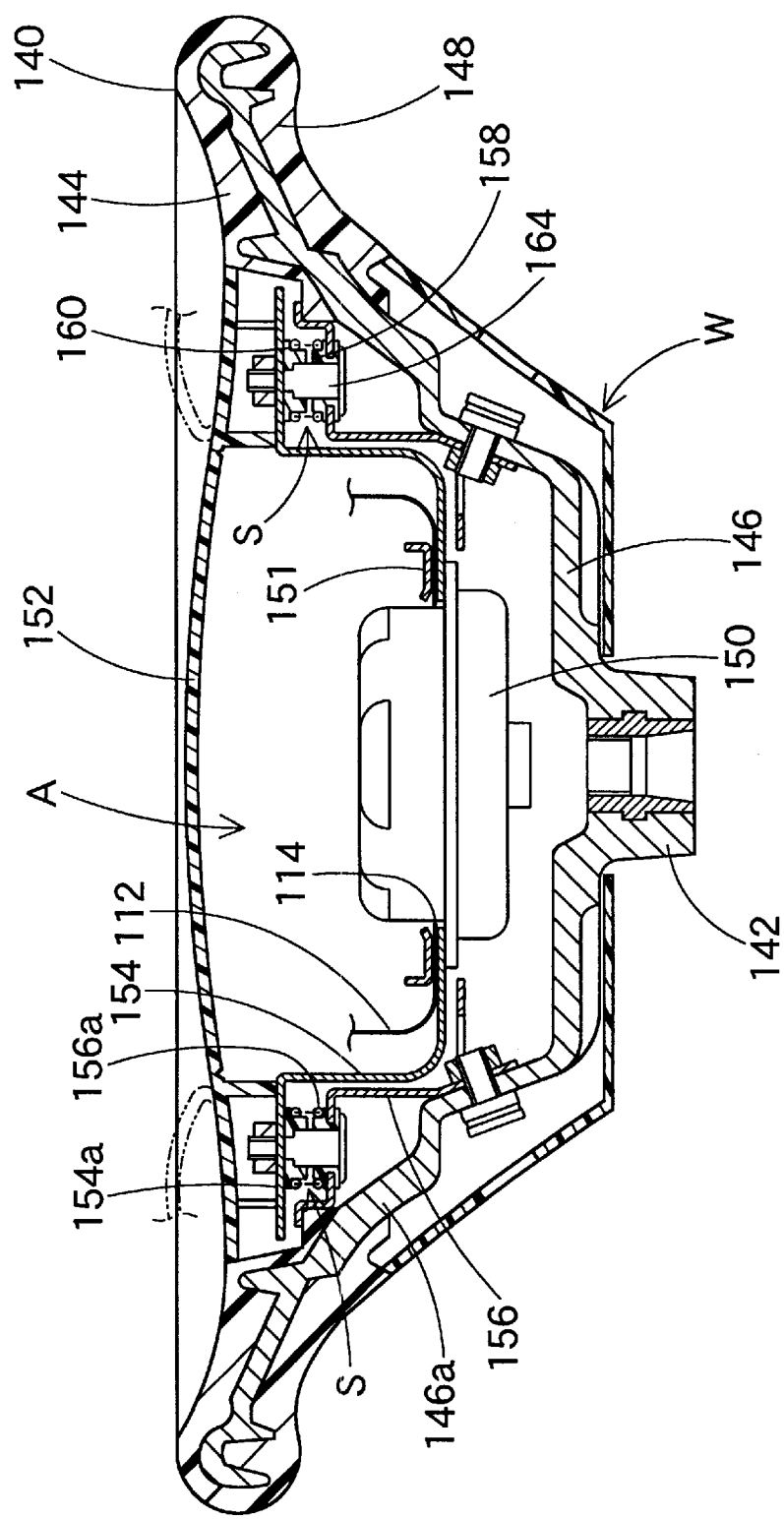
FIG. 15 is a partially cutaway cross section taken on line 15—15 of FIG. 14.
Figure 16A:
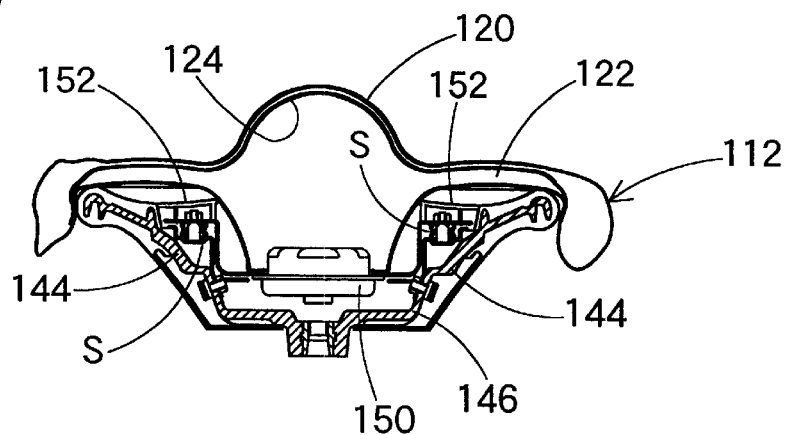
FIGS. 16(a), 16(b) and 16(c) are schematic cross sections of an air bag built in accordance with the second embodiment and incorporated in the steering wheel assembly, and in which the air bag has been inflated.
Figure 16B:
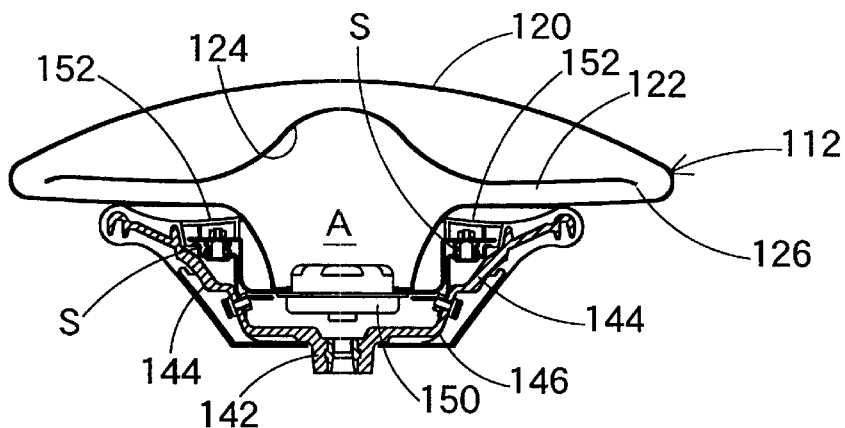
Figure 16C:
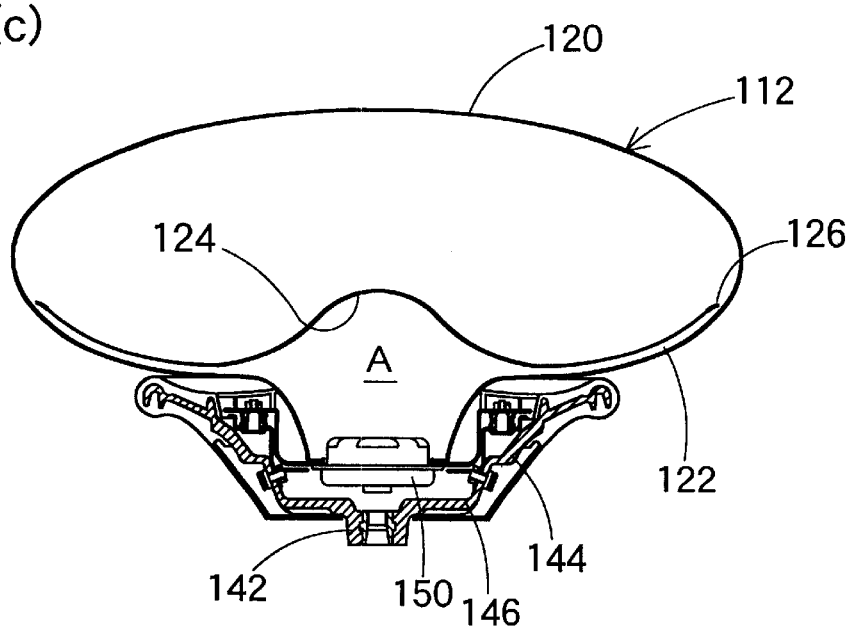

The wheel body 138 is fabricated by die-casting a wheel core 146 from aluminum and coating the core 146 with synthetic resin 148. The air bag system A and a horn switching device S (see FIGS. 15 and 16) are mounted in the wheel body 138. This is outlined below.

The air bag system A is assembled from an inflator 150, the air bag 112, and a pad cover 152 via an air bag system casing 154. Also shown is a rim retainer 151. The wheel core 146 has a spoke core 146*a* to which the support flange 156*a* of a support plate 156 is screwed. A switching device S is placed, and the air bag system A is mounted to the wheel body 138 at three positions between the support flange 156*a* and the mounting flange 154*a*. A fixed contact 158 is firmly affixed to the support flange 156*a*, while a movable contact 160 is rigidly mounted to the mounting flange 154*a*. The switching device S has a coil spring 162 placed between the fixed contact 158 and the movable contact 154*a* and is of a well-known construction. Therefore, detailed description of this switching device S is omitted herein. A guide post (stepped bolt) 164 limits vertical movement of the switching device S.

The steering wheel W having the air bag system A incorporated therein in this way is mounted to the steering mechanism via the steering shaft (not shown) and thus mounted in the vehicle.

The output signal from a sensor (not shown) that detects an impact load is applied to the inflator 150. The expanded gas ejected from the inflator 150 flows into the air bag 112 through the gas inlet port 114 in the bag 112. At this time, in the air bag in accordance with the present embodiment, the presence of the inner bag 124 and the inflation guide cylinders 122 within the bag body 120 creates the following stream of gas, thus inflating the air bag.

Because the inner bag 124 faces the gas inlet port 114, the inner bag inflates at the beginning of the entry of the gas, tearing up an H-shaped tear line 153 in the pad cover 152. This opens the door portion. The air bag 112 is ejected from the casing 154 of the air bag system (FIG. 16(*a*)).

Then, the expanded gas flows into plural guide cylinders 122 extending radially, thus inflating the air bag 112 in a direction vertical to the direction of ejection of the gas from the inflator 150. This initial phase of inflation is referred to as the primary inflation (FIG. 16(*b*)). That is, the air bag 112 inflates preferentially vertical to the direction of ejection of the gas. In consequence, the air bag is inflated into a desired form by the primary inflation.

Then, the expanded gas flows into the bag body 120 from the projected gas passage portions 126 in the inflation guide cylinders 122 and inflates between the occupant and the interfering body. This is referred to as the secondary inflation. In this way, the occupant is protected (FIG. 16(*c*)).

In the present embodiment, the projected gas passage portions are formed by the fragile joint portions 126 at the front ends of the inflation guide cylinders 122. Therefore, after the inflation guide cylinders swell rigidly (i.e., after a given pressure is obtained), the gas begins to flow into the bag body 120.

Figure 17:
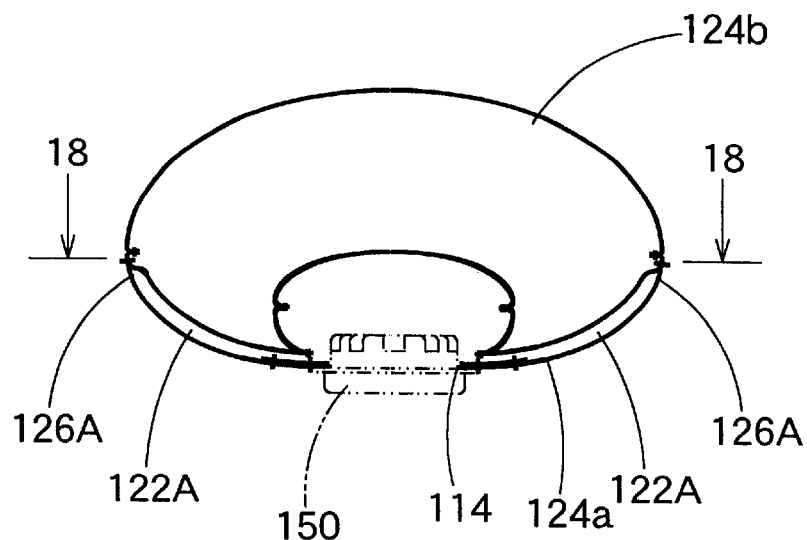
FIG. 17 is a schematic cross section of an air bag in accordance with a modification of the second embodiment.
Figure 18:
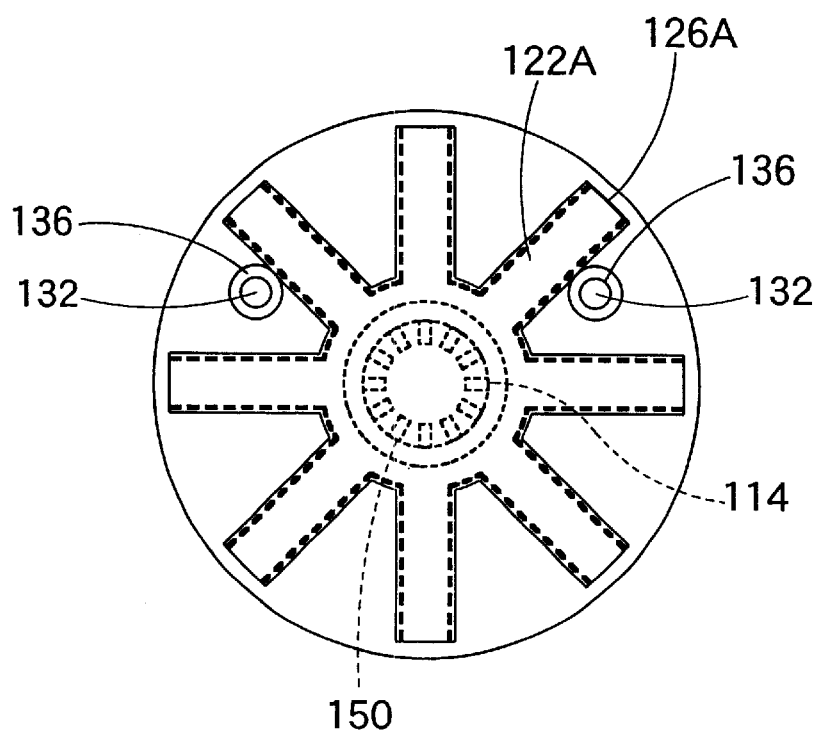
FIG. 18 is a schematic cross section taken on line 18—18 of FIG. 17.

It is to be noted that FIGS. 17 and 18 show a modification of the above-described embodiment. Only the differences with the above-described embodiment are described; those components which have been already described are indicated by the same reference numerals as in the above-described embodiment and will not be described below.

In FIGS. 17 and 18, the projected gas passage portions through which the gas will pass are formed by orifices 126A. The inner bag 124A is made of two components, i.e., a lower panel 124a and an upper panel 124b similarly to the bag body 120.

The ratio of the opening to the cross-sectional area of the inflation guide cylinders 122A in the orifices 126A can be 1/1 but usually set to 4/5 to 1/5. If the ratio is large, the expanded gas within the inflation guide cylinders 122A does not stay. The rigidification of the inflation guide cylinders 122A does not easily occur. During the initial phase of inflation, the desired shape is created with less certainty. Conversely, if the opening ratio is small, entry of the gas into the bag body 120 through the inflation guide cylinders 122A is suppressed. This may lower the secondary inflation rate of the air bag 112.

The present modified embodiment is used similarly to the above-described embodiment. Since the projected gas passage portions through which the gas will pass are formed by the orifices 126A, the expanded gas flowing into the inflation guide cylinders 122A does not completely stay in the inflation guide cylinders 122A but flows into the bag body 120 continuously while rigidifying the inflation guide cylinders 122A. Accordingly, the secondary inflation rate of the air bag body is increased compared with the rate achieved by the above-described embodiment.

Third Embodiment

Figure 19:
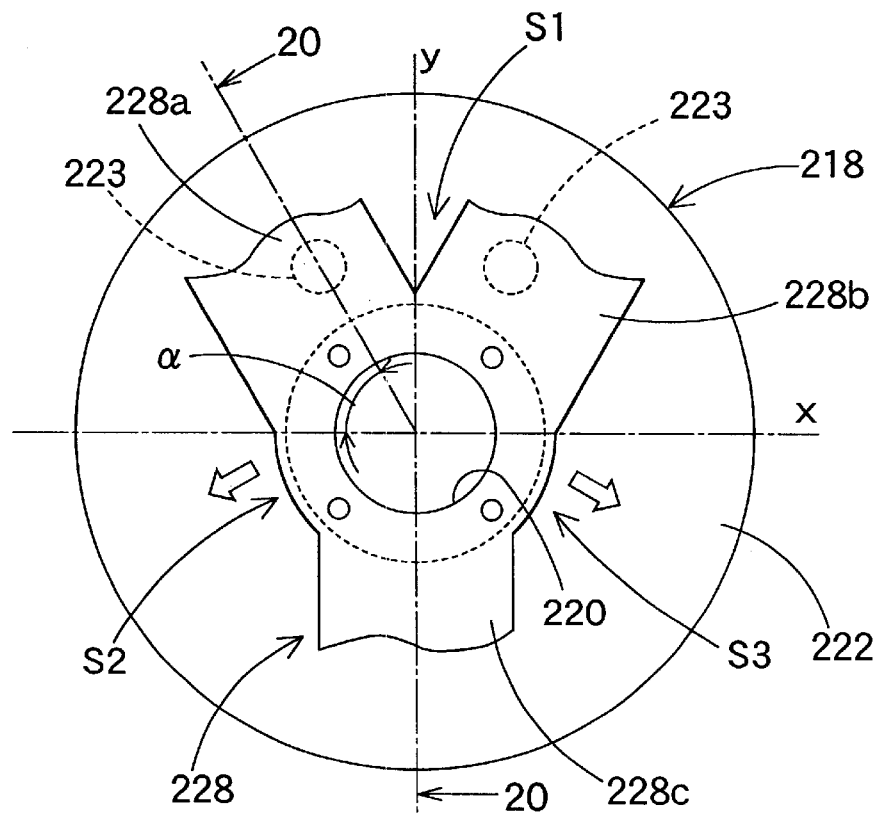
FIG. 19 is a model plan view of the front panel portion of an air bag in accordance with a third embodiment, as viewed from inside the front panel portion.
Figure 20:
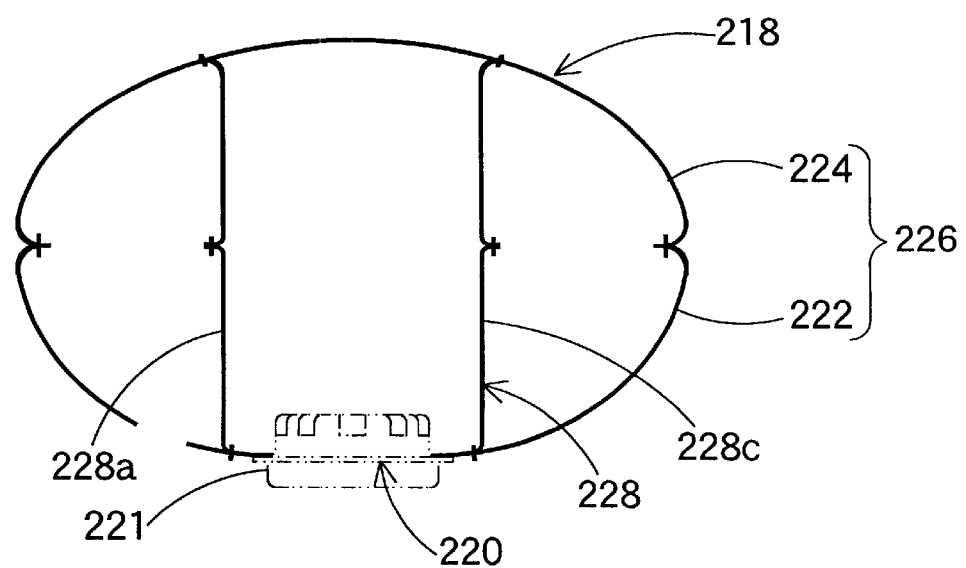
FIG. 20 is a model cross section of the portion corresponding to line 20—20 of FIG. 19, and in which the air bag has been fully inflated.

An air bag in accordance with a third embodiment of the present invention is described by referring to FIGS. 19–20. FIG. 19 is a plan view showing a model of the front panel of the air bag. FIG. 20 is a cross-sectional view taken on line 20—20 of FIG. 19 when the air bag is inflated.

The air bag in accordance with the present embodiment is generally indicated by reference numeral 218 and assumes a substantially circular two-dimensional contour as viewed from the occupant's side on completion of inflation of the bag. In the following description, the horizontal, and vertical directions are taken from the occupant's side unless otherwise stated. The bag 218 consists essentially of a bag body 226 and flow regulation fabric 228 placed within the body 226. This body 226 has a front panel 222 and a rear panel 224 located opposite to the front panel 222. The front panel 222 is provided with a gas inlet port 220 through which an inflator 221 is mounted.

In the present embodiment, the flow regulation fabric 228 also acts as three tethers 228a, 228b, and 228c which are arranged in a Y-shaped two-dimensional form from the fringes of the gas inlet port 220. The tether 228a extends upward obliquely to the left, while the tether 228b extends upward obliquely to the right in FIG. 19. The remaining tether 228c extends downward. Because of this structure, the main stream of the gas flowing in from the gas inlet port 220 goes downward obliquely to the right and left of the x-axis (horizontal axis) from the center of the gas inlet port as shown by the respective arrows. Of course, the length of the flow regulation fabric 228 corresponds to the limited amount of inflation of the air bag 218 toward the occupant.

In the present embodiment, the angle of the obliquely upwardly facing leftward tether 228a and rightward tether 228b and the width of the upwardly extending tethers 228a, 228b and of the downwardly facing tether 228c are not limited as long as the main stream of the gas flowing in from the gas inlet port 220 is directed obliquely downward to the right and left of the x-axis (horizontal axis) from the center O of the gas inlet port 220. Usually, the angle α of the obliquely upwardly directed tethers 228a and 228b that face left and right, respectively, is 30° to 60°. In the illustrated example, the angle is 55°.

If the angle α is too small, an upper V-shaped space S1 formed between the left tether 228a and the right tether 228b is greater than lower left and lower right V-shaped spaces S2 and S3, respectively, formed between the left tether 228a and the lower tether 228c and between the right tether 228b and the lower tether 228c, respectively. As a result, it is difficult to derive the advantages of the present invention. That is, the primary stream of gas easily flows upwardly of the y-axis from the center of the gas inlet port. Consequently, the relative amount of the gas flowing obliquely downwardly to the right and left of the x-axis (horizontal axis) from the center of the gas inlet port decreases. If the angle α is too large, the action of the left tether 228a and the right tether 228b (more specifically, their lower fringes) to guide the gas obliquely downward weakens. Again, the advantages of the invention are not derived sufficiently.

The width of the left tether 228a, the right tether 228b, and the lower tether 228c is made larger than the width of the conventional tether to regulate the gas that flows in. This gas is referred to as the primary stream of gas. In particular, the width is preferably made larger than the width of the gas inlet port (i.e., the diameter of the gas ejection portion of the inflator) 220. Especially, it is substantially essential that the width of the lower tether 228c be larger than the width of the gas inlet port 220 to prevent the primary stream of gas from flowing along the y-axis, i.e., immediately downward. On the other hand, no limitations are placed on the upper limit of the tether width as long as the action of the tethers themselves and the flow regulation action achieved by the present invention are not hindered. To reduce the cost of the material of the air bag, the weight of the bag, and the height of the bag in folded state, the tether width is made equal to the width of the fabric that reinforces the gas inlet port 220. Note that the tethers 228a, 228b, and 228c are not always required to be uniform in width. Their widths may be appropriately increased and decreased as long as the advantages of the present invention are not reduced. Of course, the length of the flow regulation fabric 228 corresponds to the limited amount of inflation of the air bag 218 toward the occupant.

Figure 21:
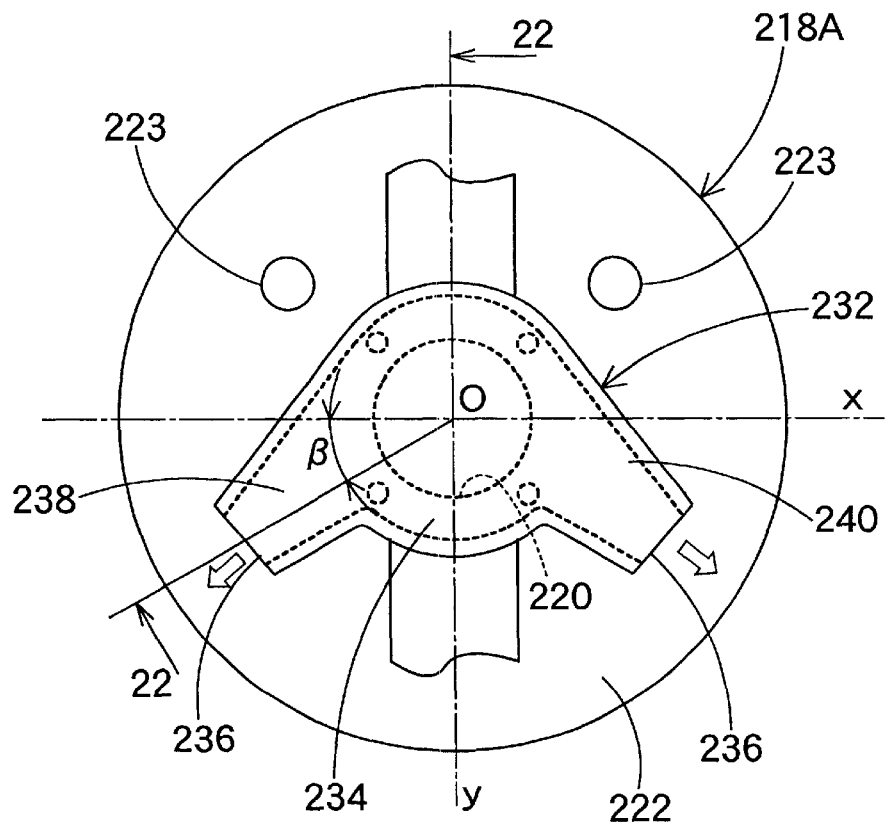
FIG. 21 is a model plan view of an air bag in accordance with a modification of the third embodiment, as viewed from inside the front panel portion.
Figure 22:
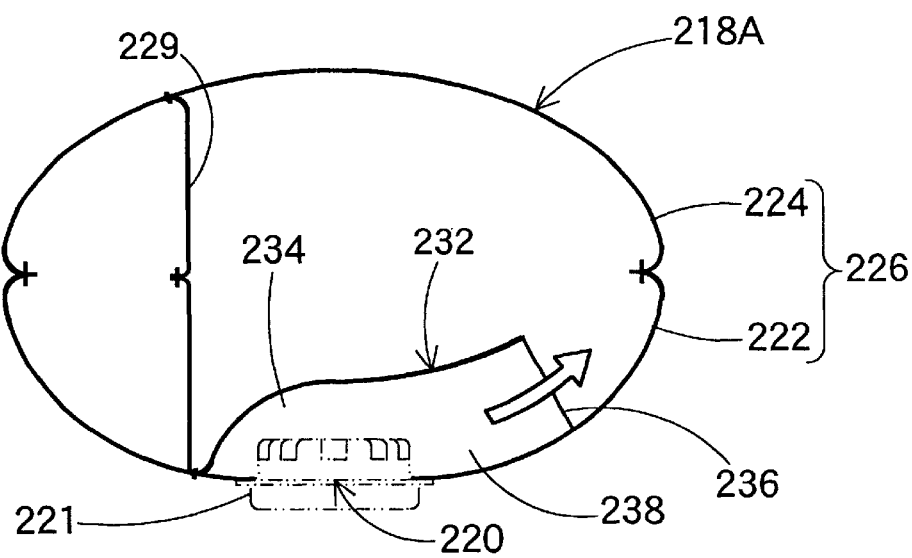
FIG. 22 is a model cross section of the portion corresponding to line 22—22 of FIG. 21, and in which the air bag has been inflated.

FIGS. 21 and 22 show a modification of the present embodiment. FIG. 21 is a plan view of a model of the front panel of the air bag in accordance with the present embodiment. FIG. 22 is a cross-sectional view of the model shown in FIG. 21, taken on line 22—22 when the bag has been inflated. Those components which have been already described in connection with the third embodiment are indicated by the same reference numerals as in the description of the third embodiment and will not be fully described below.

The air bag in accordance with the present embodiment is indicated by reference numeral 218A and has flow regulation fabric 232 directly connected to the gas inlet port 220. That is, the bag has a primary gas stream inflow chamber 234 that covers the top of the gas inlet port 220 and a pair of guide cylinders (i.e., a left guide cylinder 238 and a right guide cylinder 240). The primary gas stream inflow chamber 234 is substantially coaxial with the gas inlet port 220. The guide cylinders 238 and 240 are located obliquely below the primary gas stream inflow chamber 234 and to the left and right, respectively, of this chamber 234. The guide cylinders 238 and 240 extend halfway to the fringes of the front panel 222. These ends form projected gas outflow portions 236. A tether 229 limits the amount of inflation of the air bag 218A toward the occupant.

No limitations are imposed on the longitudinal direction of the guide cylinders 238 in the same way as in the above embodiment as long as the gas entering from the gas inlet port 220 flows to the right and left obliquely downward of the x-axis (horizontal axis) from the center of the gas inlet port. The angle β of the left guide cylinder 238 and the right guide cylinder 240 that extend obliquely downward is usually 10° to 60°, preferably 15 to 45°. More preferably, the angle β is 30° (as in the illustrated example).

If the angle β is too large or too small, it is difficult to derive the advantages of the present invention sufficiently. In particular, if the angle β is too small, the time at which the air bag is inflated between the rim of the bag and the occupant's abdomen tends to be delayed. The y-axis (downward) component of the velocity vector of the primary stream of gas (indicated by the blank arrows) flowing into the bag body 226 from the guide cylinders 238 and 240 is small and so the force to inflate the bag downward is weak. As a result, the force based on the secondary stream of gas to cause the bag to enter between the rim and the abdomen is weak.

If the angle β is too large, the time at which the air bag is inflated in the downward direction is advanced. However, the air bag is brought closer to the occupant's torso during the primary inflation of the bag. This creates the possibility of contact with the occupant's torso. That is, the occupant's torso may receive a large load when contacting the bag, because the velocity vector of the y-axis component (downward-direction component) of the primary stream of gas flowing into the bag body 226 from the guide cylinders 238 and 240 increases and because the primary inflation of the bag is directed toward the space between the rim of the steering wheel and the abdomen of the torso.

In the present embodiment, the height of the primary gas inflow chamber 234 assumed during the inflation is set equal to the height of the left guide cylinder 238 and the right guide cylinder 240. A double bag structure whose inner bag is formed by the primary gas inflow chamber 234 may also be adopted. In this case, the inner bag smoothes the ejection of the bag out of the bag accommodation chamber.

Preferably, the ends (projected gas passage portions) 236 of the guide cylinders 238 and 240 are located at positions spaced by more than one third, preferably more than half, of the distance from the center O of the gas inlet port to the fringes of the front panel 222, because it is easy to secure directivity of the velocity vector of the gas stream.

Furthermore, it is desired that the left guide cylinder 238 and the right guide cylinder 240 taper off toward the projected gas passage portions 236, because this makes it easy to secure a sufficient magnitude of velocity vector of the primary stream of gas indicated by the blank arrows. However, if the degree of taper is too great, the resistance that the gas undergoes in flowing out increases. This may lower the relative speed of inflation of the whole air bag. Usually, the percent of the taper relative to the cross-sectional area of the base portions of the guide cylinders 238 and 240 is 30% to 80%, preferably 40% to 70%. In terms of the angle of the taper (i.e., the tilt angle with respect to the axis), the percent is 10% to 30%, preferably 15% to 250.

The projected gas passage portions 236 are normally open. These passage portions 236 may also be made of tear seams which are normally closed and torn up by a given pressure of gas and form a gas passage port. The tear seams are formed normally by sewing using weak sewing thread. Any other method such as bonding and French seaming may also be employed. This structure makes more reliable the operation of the air bag 218A to inflate to the left and right obliquely downward. Since the left guide cylinder 238 and the right guide cylinder 240 protrude to the left and right obliquely downward rigidly as a primary inflation, the operation of the air bag to inflate to the right and left obliquely downward is rendered more reliable. In the illustrated example, horizontal cross sections of the left guide cylinder 238 and the right guide cylinder 240 are partially formed by the front panel 222 forming the bag body 226. The guide cylinders may be fabricated as separate bodies and attached to the front panel later. Moreover, the guide cylinders may be appropriately arranged along the y-axis (i.e., the vertical direction) as long as the advantages of the present invention are not devalued (i.e., as long as the action of the left guide cylinder 238 and the right guide cylinder 240 is not hindered). In addition, each of the left and right guide cylinders may be fabricated as a branching structure.

Methods of fabricating the air bag 218 in accordance with the third embodiment and the air bag 218A in accordance with its modified embodiment are described. Common portions are described at the same time.

The air bags 218 and 218A are fabricated by preparing fabric normally made of threads of polyester or nylon, cutting the fabric into shapes for forming the front panel 222, the rear panel 224, and the flow regulation fabric 228 (or 232) (in the FIGS. 21–22 embodiment, a shape for forming the tether 229 is added), and sewing together these pieces of fabric. Bonding or French seaming may also be used instead of or in combination with the sewing.

The panels may be made of fabric coated with rubber. In FIGS. 19 and 20, the flow regulation fabric 228 is made of a Y-shaped panel. In FIGS. 21 and 22, the flow regulation fabric 232 is made of a V-shaped panel.

The bag body 226 is fabricated by sewing together the front panel 222 on the bottom side and the rear panel 224 on the ceiling side to which the flow regulation fabric 228 (or 232) and the panel for the tether 229 have been sewn such that the surfaces forming the inner surfaces face outward and then turning the sewn body inside out. The front panel 222 is normally provided with one or more gas vent holes 223. In the illustrated example, two gas vent holes 223 spaced apart from each other horizontally are formed. Usually, one or more pieces of annular reinforcing fabric (not shown) are sewn to the fringes of the gas inlet port 220 and to the fringes of the gas vent holes 223 to reinforce them.

The manner in which the air bag 218 or 218A is used is described while taking the FIGS. 19–20 embodiment principally as an example. With respect to the FIGS. 21–22 embodiment, only the differences with the FIGS. 19–20 embodiment are described.

Figure 23:
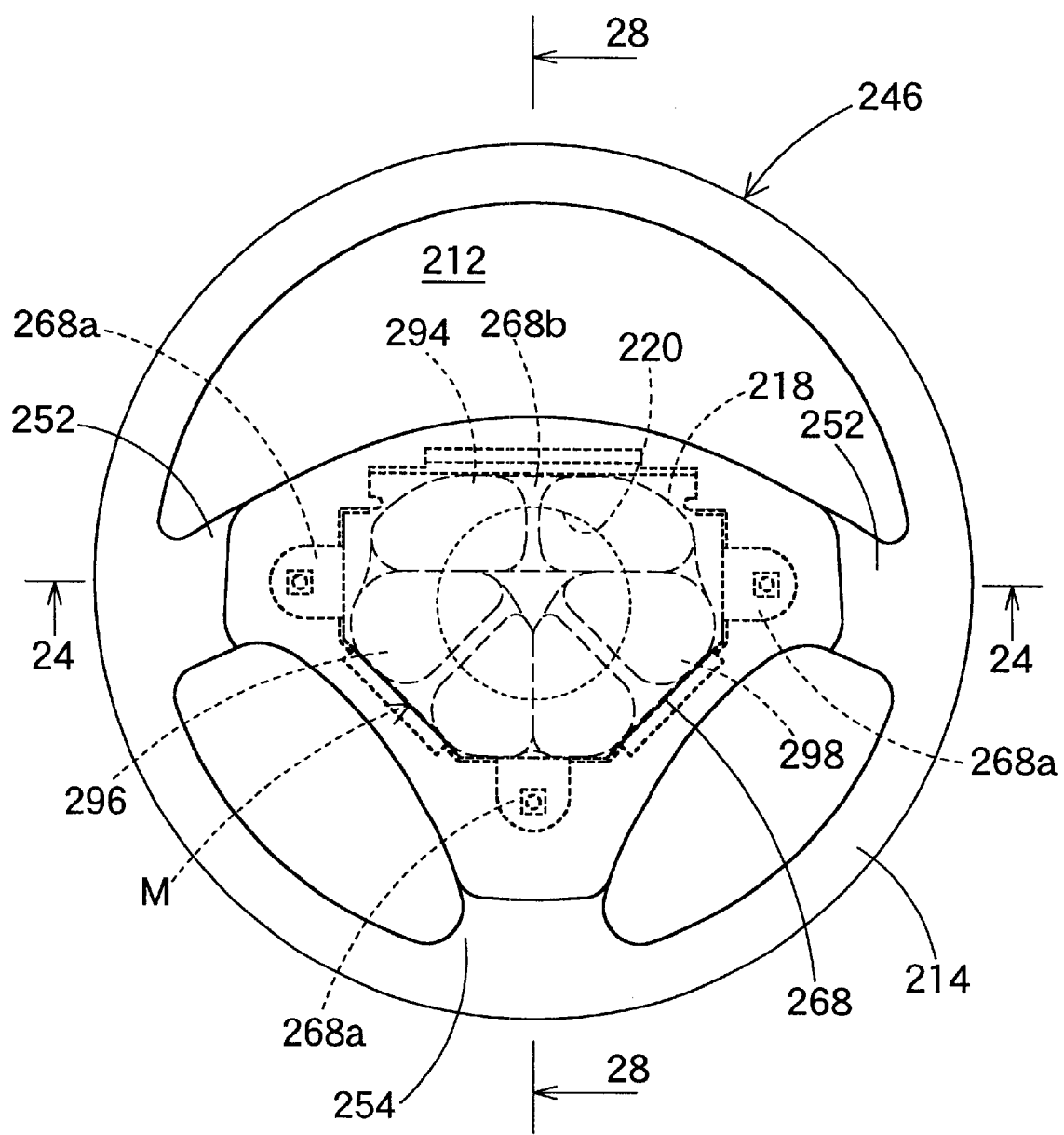
FIG. 23 is a plan view of a steering wheel assembly incorporating an air bag system that houses an air bag in accordance with the third embodiment.
Figure 24:
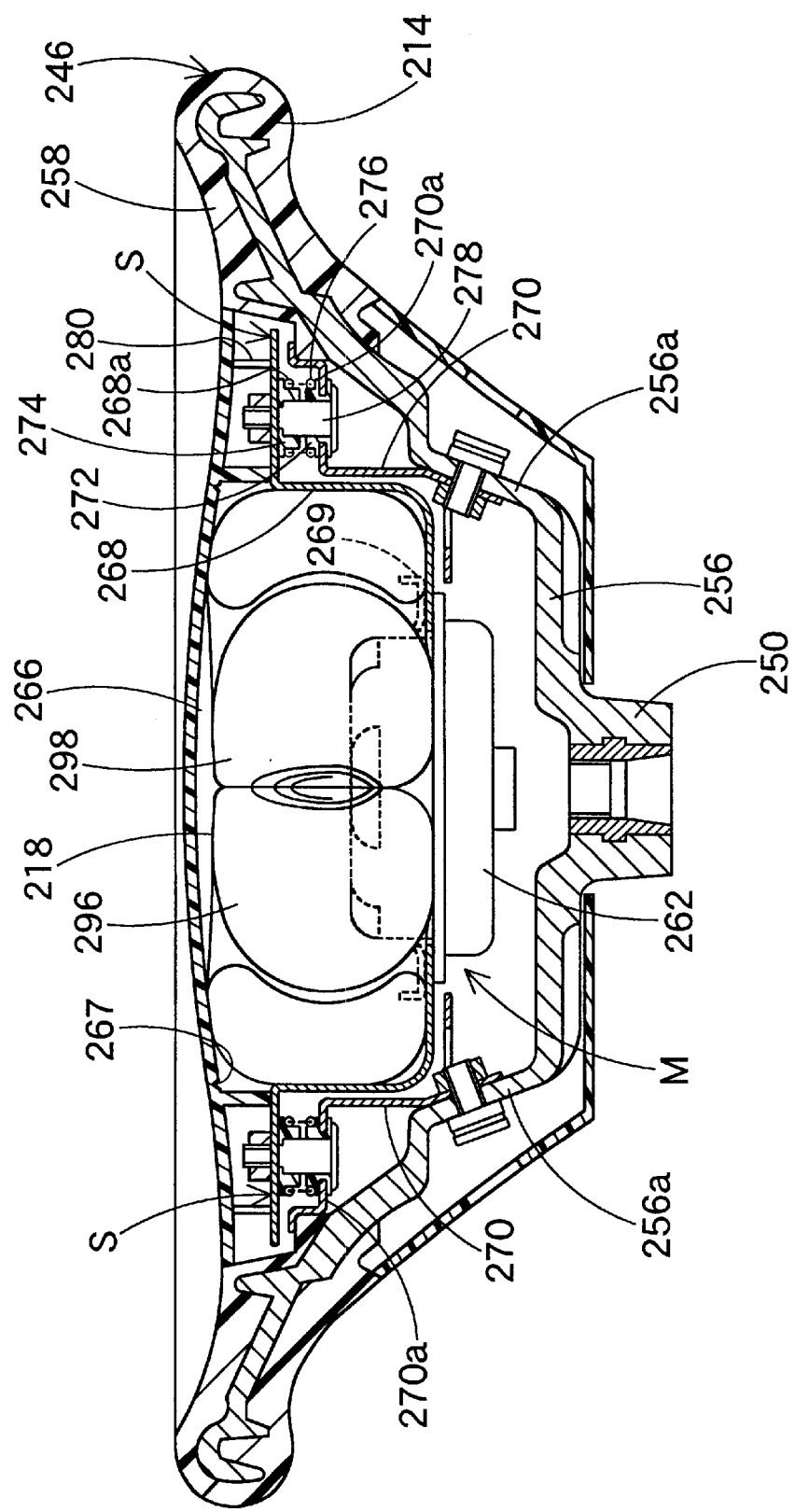
FIG. 24 is a schematic cross section taken on line 24—24 of FIG. 23.

The air bag 218 is folded and mounted in an air bag system M in use as shown in FIGS. 23 and 24. In the following example shown in FIG. 23, the air bag is mounted in a steering wheel body 246 having three spokes. The same principle applies to cases where the steering wheel body has four spokes and two spokes, respectively.

The steering wheel body 246 comprises a rim 214 gripped during steering, a boss 250 connected to the steering shaft (not shown), and three spokes 252, 254 connecting the boss 250 with the rim 214. These three spokes 252 and 254 extend to the left, to the right, and downwardly, respectively.

The steering wheel body 246 is fabricated by die casting a wheel core 256 from aluminum or the like and coating the core with a synthetic resin 258 such as polyurethane. The air bag system M and a horn switching device S are mounted in the steering wheel body 246 (see FIGS. 23 and 24). This is summarized below.

The air bag system M is fabricated as an integrated unit by mounting an inflator 262, the air bag 218, and a pad cover 266 via an air bag casing (bag holder) 268. The air bag system M is mounted by supporting it at three points (see FIG. 23) by placing the horn switching device S between the support flange 270a of a support plate 270 and the mounting flange 268a of the casing 268. The support plate 270 is screwed to the spoke core 256a of the wheel core 256. A fixed contact 272 is firmly affixed to the support flange 270a, while a movable contact 274 is rigidly mounted to the mounting flange 268a. The switching device S has a coil spring 276 placed between the fixed contact 272 and the movable contact 274 and is of a well-known construction. Therefore, detailed description of this switching device S is omitted herein. A guide post (stepped bolt) 278 moves the movable contact vertically. Also shown are pressure ribs 280 for actuating the switch. If necessary, guides or fins may be formed so that the air ejection port of the inflator 262 ejects gas to the right and left of the air bag obliquely downwardly of the bag.

Figure 26:
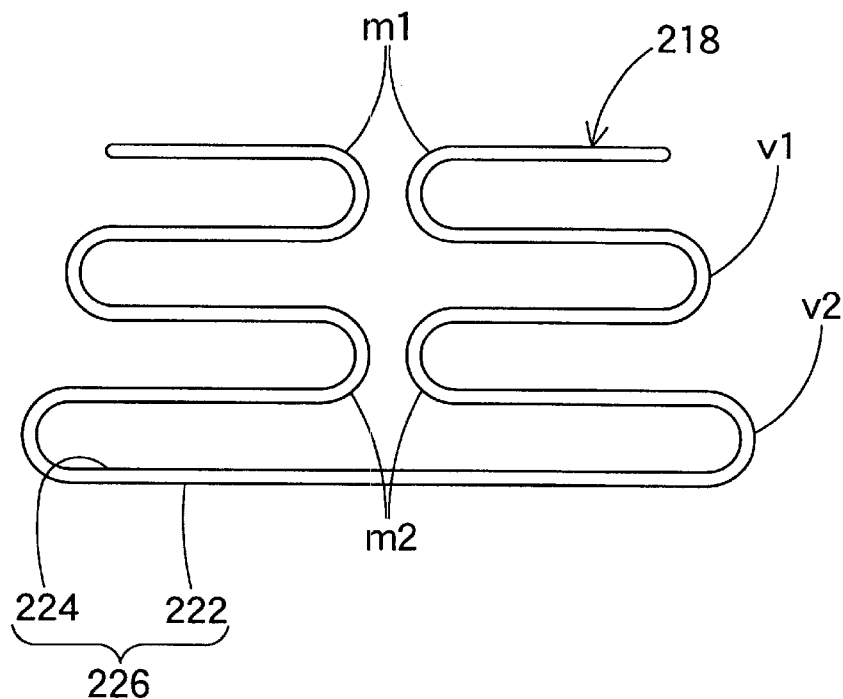
FIG. 26 is a schematic cross section taken on line 26—26 of FIG. 25B, and in which the air bag shown in FIGS. 25A–C is folded in a first stage.
Figure 27:
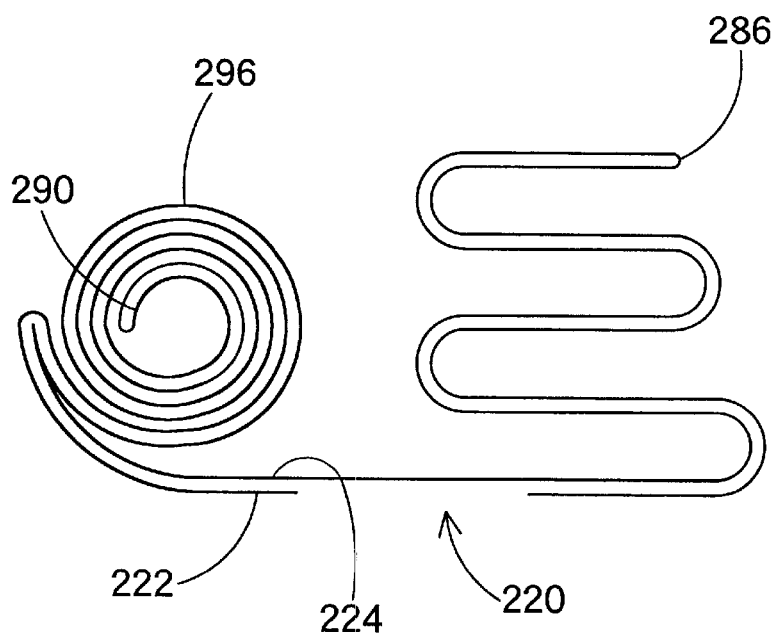
FIG. 27 is a schematic model end view corresponding to line 27—27 of FIG. 25C, and in which the air bag is folded in a second stage.

No limitations are placed on the above-described method of folding the air bag 218. Where the bag is folded by the following methods which will be described by referring to FIGS. 25–27, the increase in the height of the folded air bag can be reduced. Furthermore, the bag can be easily quickly inflated to the right and left obliquely downward with desirable results.

The rear panel 224 located opposite to the gas inlet port 220 is placed on the front panel 222 having the gas inlet port 220. Then, they are unfolded flat, following which they are folded in two steps as described below.

Figure 25A:
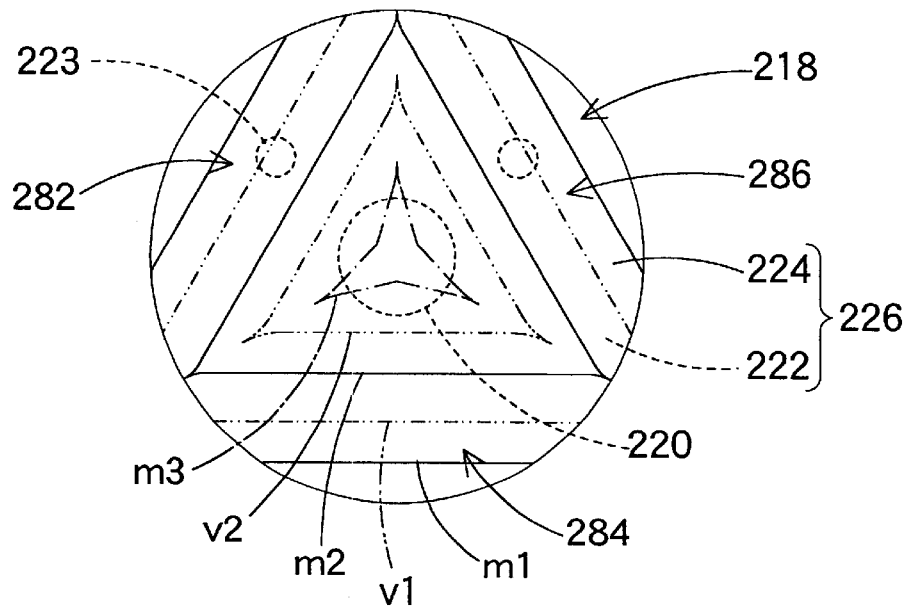
FIGS. 25A, 25B and 25C are diagrams illustrating a method that can be used to fold the air bag in accordance with the third embodiment.
Figure 25B:
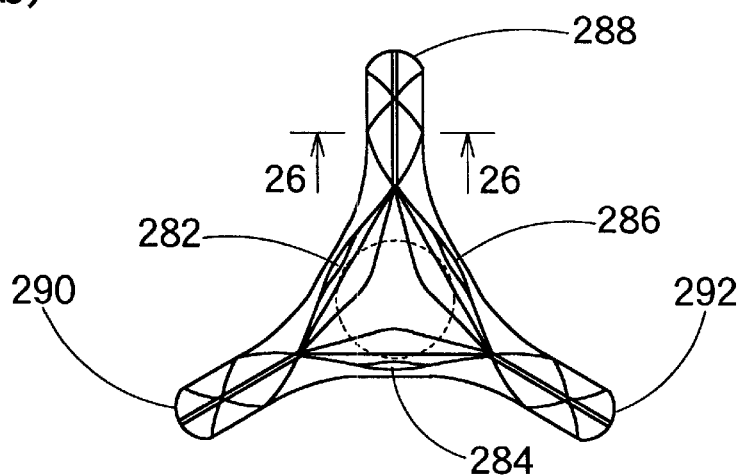

In the first step, the rear panel 224 opposite to the gas inlet port 220 shown in FIG. 25A is placed at a higher position in the two-dimensional circular geometry. This is folded in a serpentine manner such that the three-split equal fringes 282, 284, and 286 about the gas inlet port 220 are close to the gas inlet port 220. Thus, this folding produces a two-dimensional shape as shown in FIG. 25B. More specifically, the panel is folded to form a first convex fold m1, a first concave fold v1, a second convex fold m2, a second concave fold v2, and a third convex fold m3 as viewed from the outside. These folds are shown in FIG. 25B in an unfolded state. The geometry shown in FIG. 25B consists of the gas inlet port 220 which is substantially circumscribed and surrounded by arcs equally spaced from each other circumferentially and which have three radial protrusions 288, 290, and 292. Thus, the geometry has a three-fold symmetry.

Figure 25C:
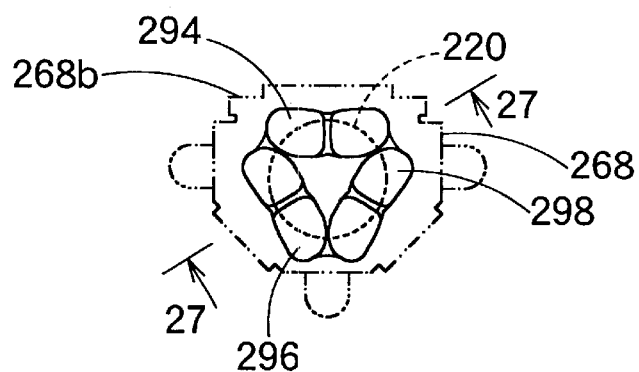

In the second step, the radial protrusions 288, 290, and 292 of the two-dimensional shape as shown in FIG. 25B are wound outward toward the gas inlet port 220, i.e., toward the front panel 222, to form rolls 294, 296, and 298. Then, they are turned inside out and placed on the rear panel 224 (see FIG. 27). They are folded into a substantially inverted triangular form in two dimensions as shown in FIG. 25c.

Before the air bag 218 is folded, a retainer 269 is inserted in the bag 218. Bolts (not shown) for the retainer are made to protrude through mounting holes formed at the fringes of the gas inlet port. Under this condition, the aforementioned folding operation is performed. After completion of the folding, the air bag 218 may be packaged in film to hold the shape.

The air bag 218 folded in this way is received in an air bag casing (bag holder) 268. The bolts (not shown) for the retainer 269 are inserted in holes extending through the bottom wall of the bag holder and fastened with nuts (not shown).

At this time, the air bag 218 is placed on the bottom wall 268b of the air bag case such that only one roll 294 of the three rolls 294, 296, and 298 is located at the upstream end of the case bottom wall 268b.

The air bag system M received in the air bag casing 268 in this way is mounted in the steering wheel by a conventional method. The steering wheel 212 having the air bag system mounted therein as described above is mounted in the steering wheel via the steering shaft (not shown). In this manner, the air bag system is mounted in the vehicle.

Figure 28:
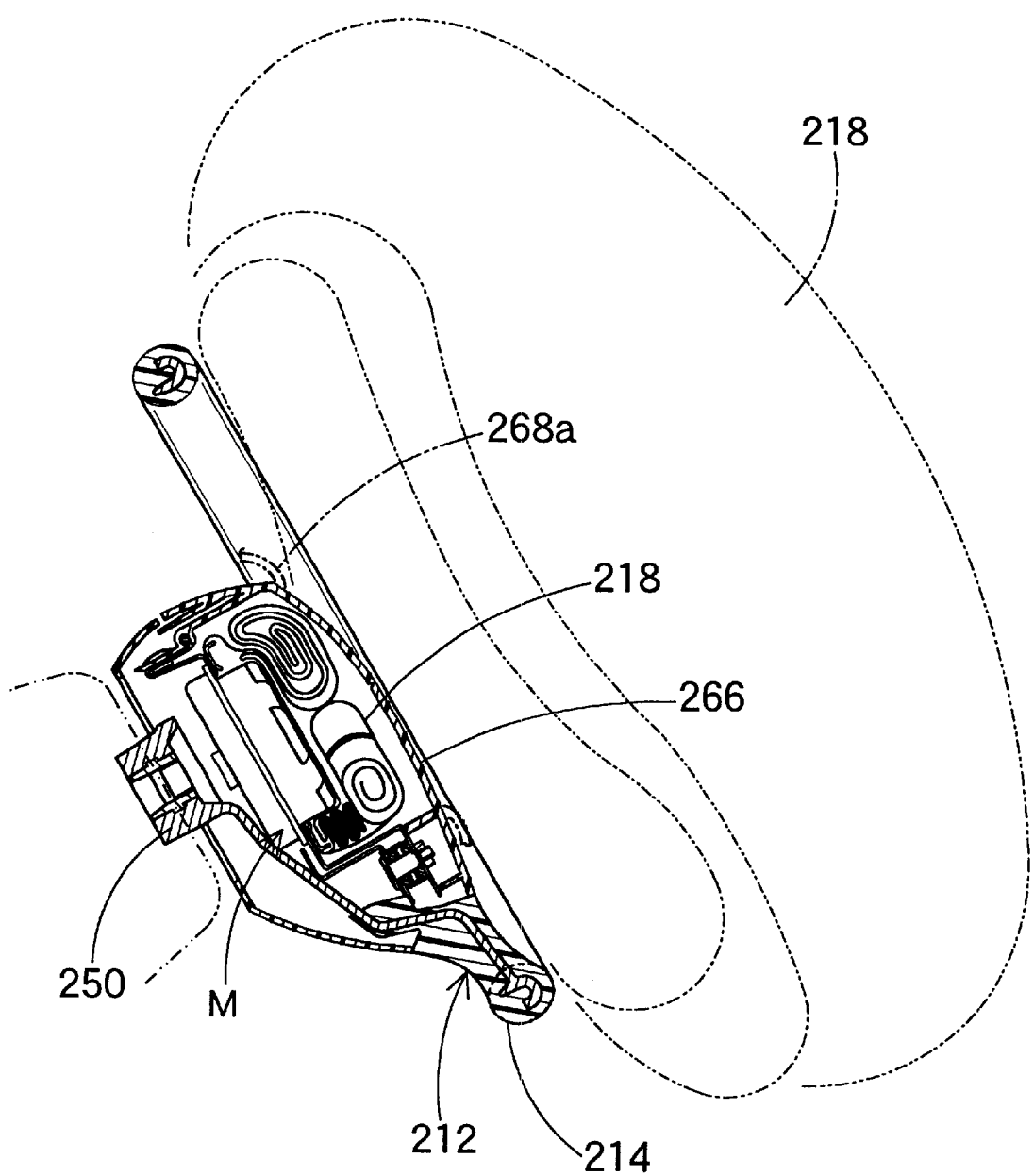
FIG. 28 is a model end view corresponding to line 28—28 of FIG. 23, showing the manner in which the air bag is inflated.

The output signal from a sensor (not shown) that detects an impact load is applied to the inflator 262, which in turn ejects a gas for inflation. The gas flows into the air bag 218 from the gas inlet port 220. The bag 218 is inflated to thereby tear up the H-shaped tear line 267 in the pad cover 266, thus forming an air ejection port. Then, the bag 218 is ejected from the air bag system casing 268 and inflates (see FIG. 28).

Figure 29A:
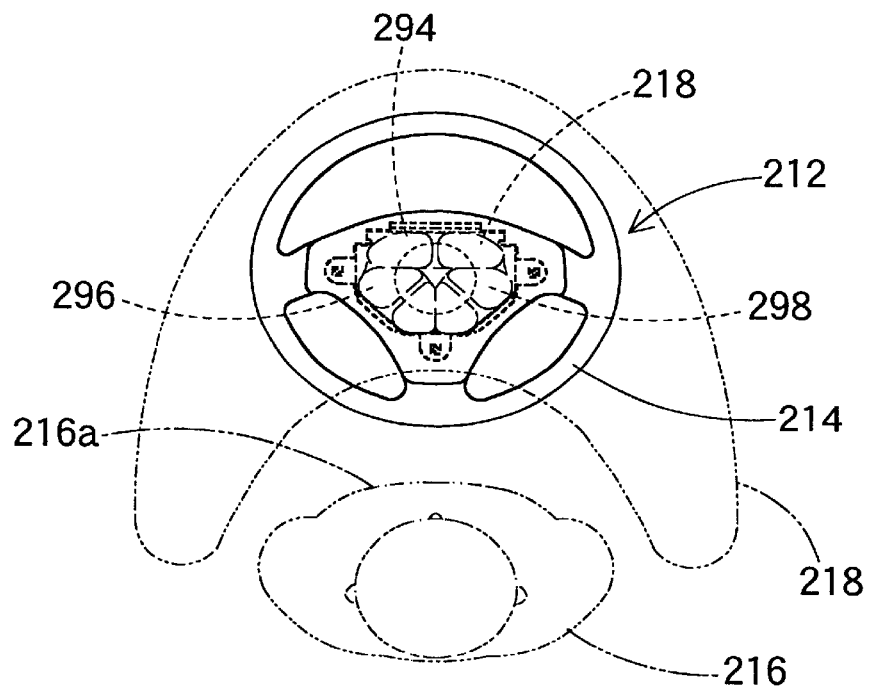
FIGS. 29A and 29B are plan views showing the positional relation between the air bag in accordance with the third embodiment and the car occupant at the beginning (FIG. 29A) of inflation of the air bag and at the time of completion of the inflation (FIG. 29B)
Figure 29B:
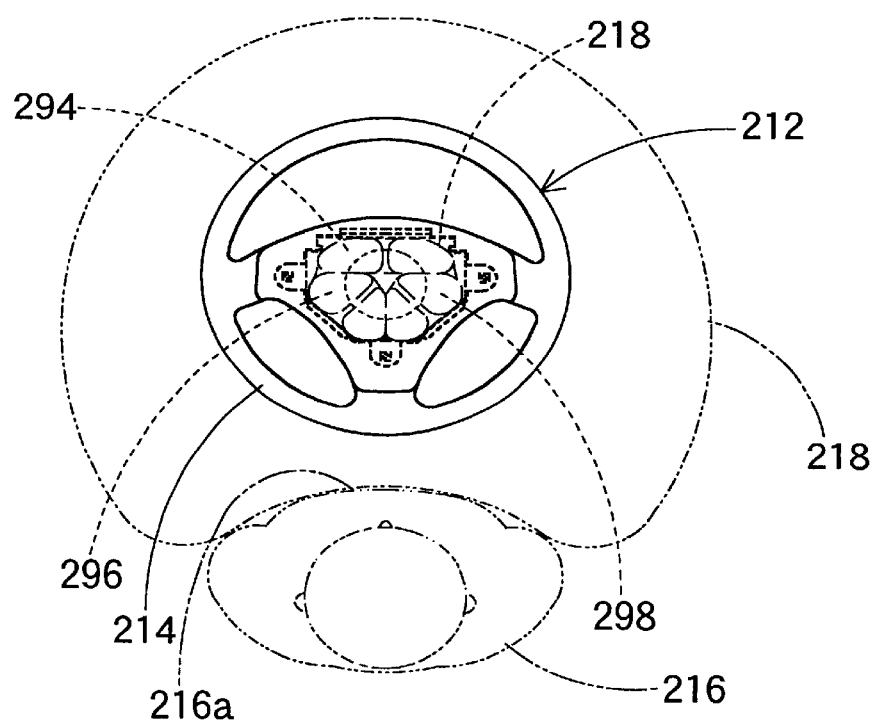
Figure 30:
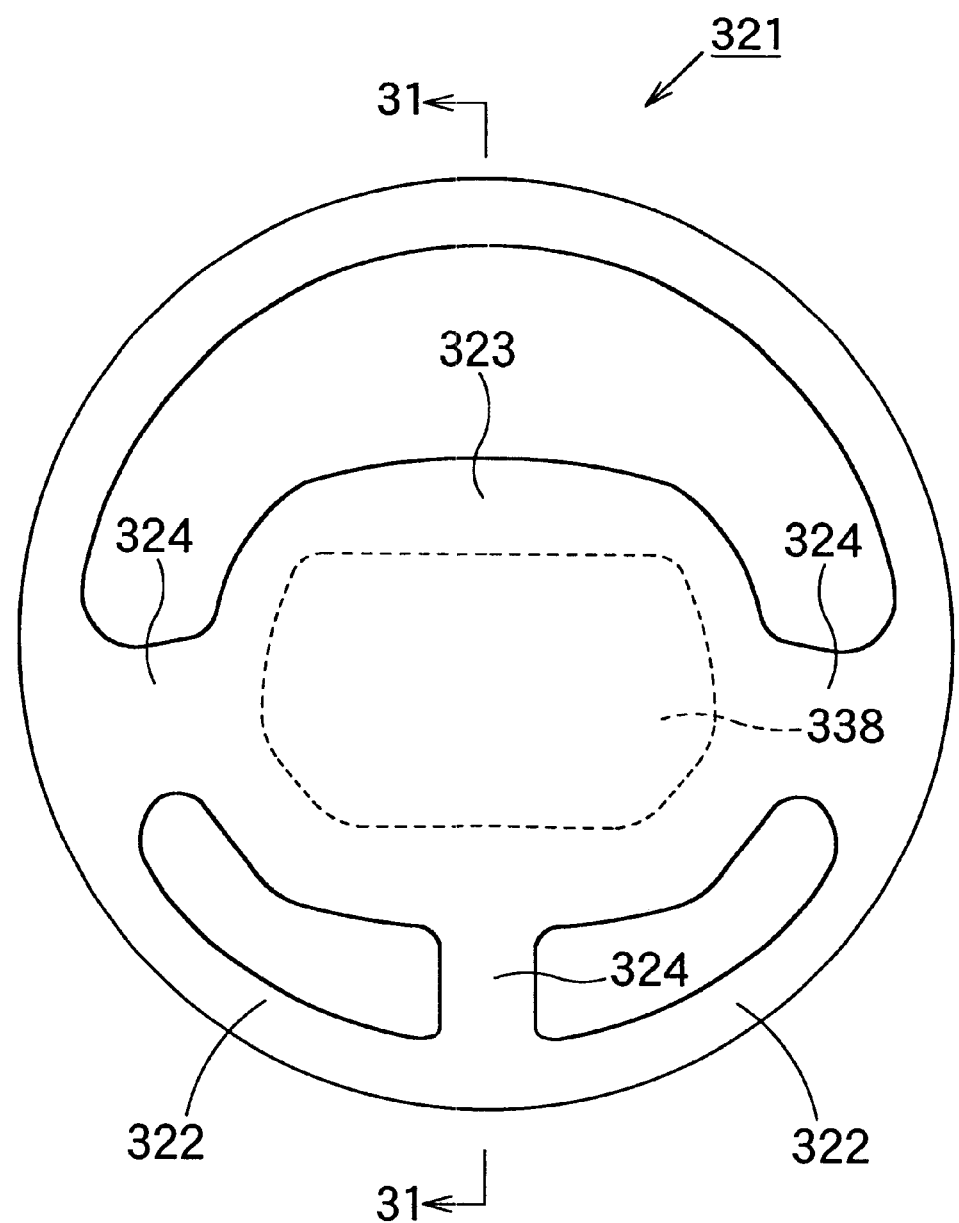
FIG. 30 is a front elevation of a steering wheel incorporating an air bag in accordance with a fourth embodiment.
Figure 31:
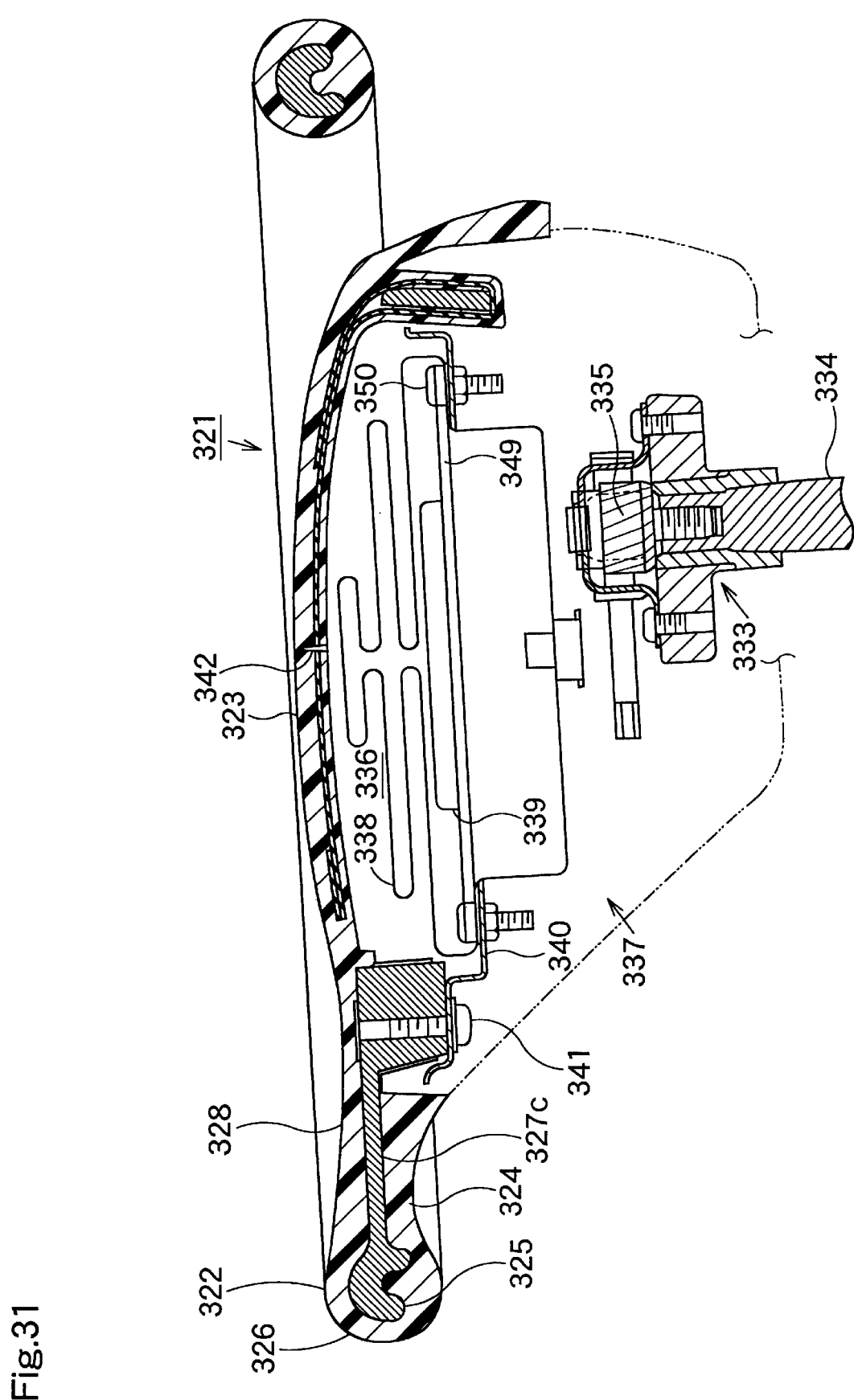
FIG. 31 is a cross-sectional view taken on line 31—31 of FIG. 30.

In the air bag 218 in accordance with the present embodiment, the presence of the flow regulation fabric 228 in the bag body 226 creates the following stream of gas. First, the primary stream of the gas for inflation is guided to the right and left obliquely downward by the flow regulation fabric 228. Therefore, as shown in FIG. 29A, the bag body 226 is inflated to the right and left obliquely downward. That is, the bag body protrudes to both sides of the position of the abdomen 216a of the occupant's torso 216. Therefore, during the initial phase of inflation, the air bag does not interfere with the occupant's torso 216. Then, as shown in FIG. 29B, the secondary stream of gas subsequent to the primary gas stream that caused the air bag to inflate downward inflates the air bag 218 between the rim 214 of the steering wheel and the occupant's torso 216 quickly.

Figure 1:
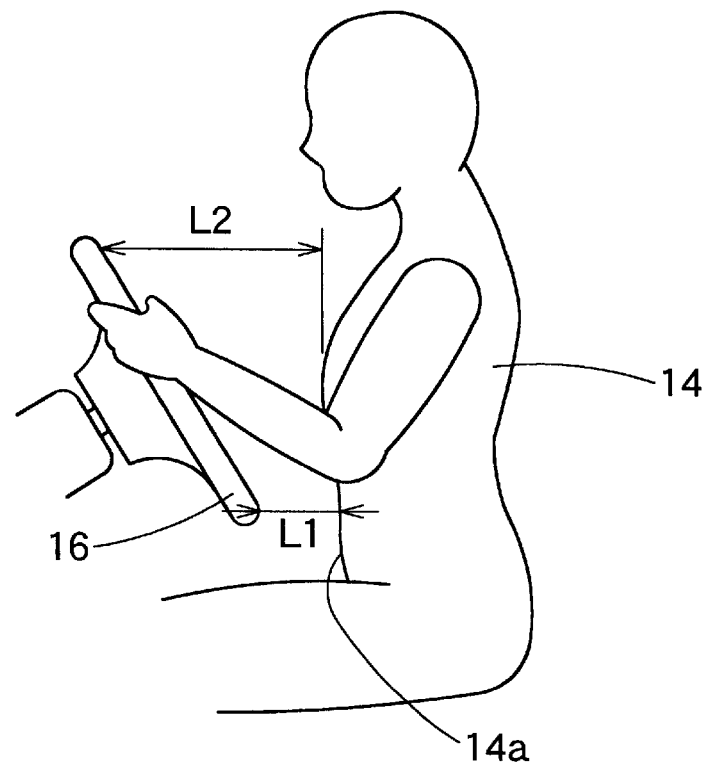
FIG. 1 is a model diagram illustrating the vertical positional relation between a car occupant and the steering wheel of a car.
Figure 2:
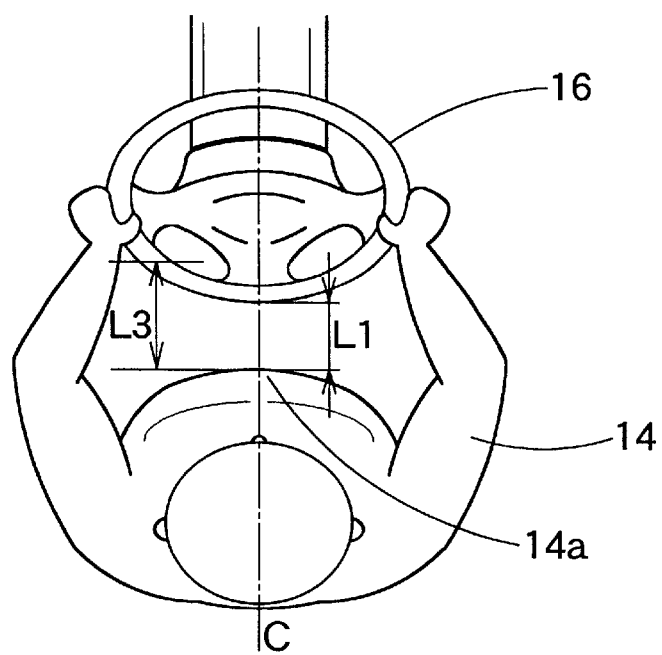
FIG. 2 is a model diagram illustrating the horizontal positional relation between the car occupant and the steering wheel shown in FIG. 1.

At this time, the secondary stream of gas has a velocity vector directed to the vertical axis even if the distance between the bottom of the rim 214 and the abdomen 216a of the occupant's torso at the position of the longitudinal centerline C (see FIG. 1) (y-axis direction) is smaller than the distances at other positions. Consequently, the air bag 218 can be quickly urged to enter between the rim 214 and the occupant's abdomen 216 from the gap between the rim 214 and the occupant's torso 216. In this way, interference between the occupant's torso and the rim of the steering wheel is prevented.

When this air bag folded by the aforementioned method inflates, the velocity vector during the initial phase of the air bag 218 can be suppressed. When the bag interferes with the occupant's torso, the load applied to the torso can be reduced. That is, the presence of the three rolls 288, 290, and 292 divides the amount of gas in each direction of inflation into three. Hence, the velocity vector in each direction is decreased.

The third embodiment has been described thus far. Modifications of the third embodiment are similar. In the air bag 218A in accordance with the modifications of the third embodiment, the left guide cylinder 238 and right guide cylinder 240 direct all the primary stream of gas toward these cylinders 238, 240. Consequently, desired inflation characteristics can be obtained easily and more reliably.

Fourth Embodiment

In the present embodiment, the invention is embodied in an air bag mounted in an automotive steering wheel. This embodiment is described next by referring to FIGS. 30–35.

The steering wheel in which the air bag is mounted is first described briefly. The steering wheel is indicated by numeral 321 in FIGS. 30 and 31 and has an arc-shaped rim 322, a pad 323 placed in the center of the rim 322, and three spokes 324 extending from the rim 322. This rim 322 comprises a rim core 325 and a rim coating 326 that covers the rim core. The spokes comprise spoke cores 327a–327c, respectively, made of the same metal as the material of the rim core 325, and a spoke coating 328 that covers the spoke cores.

Figure 32:
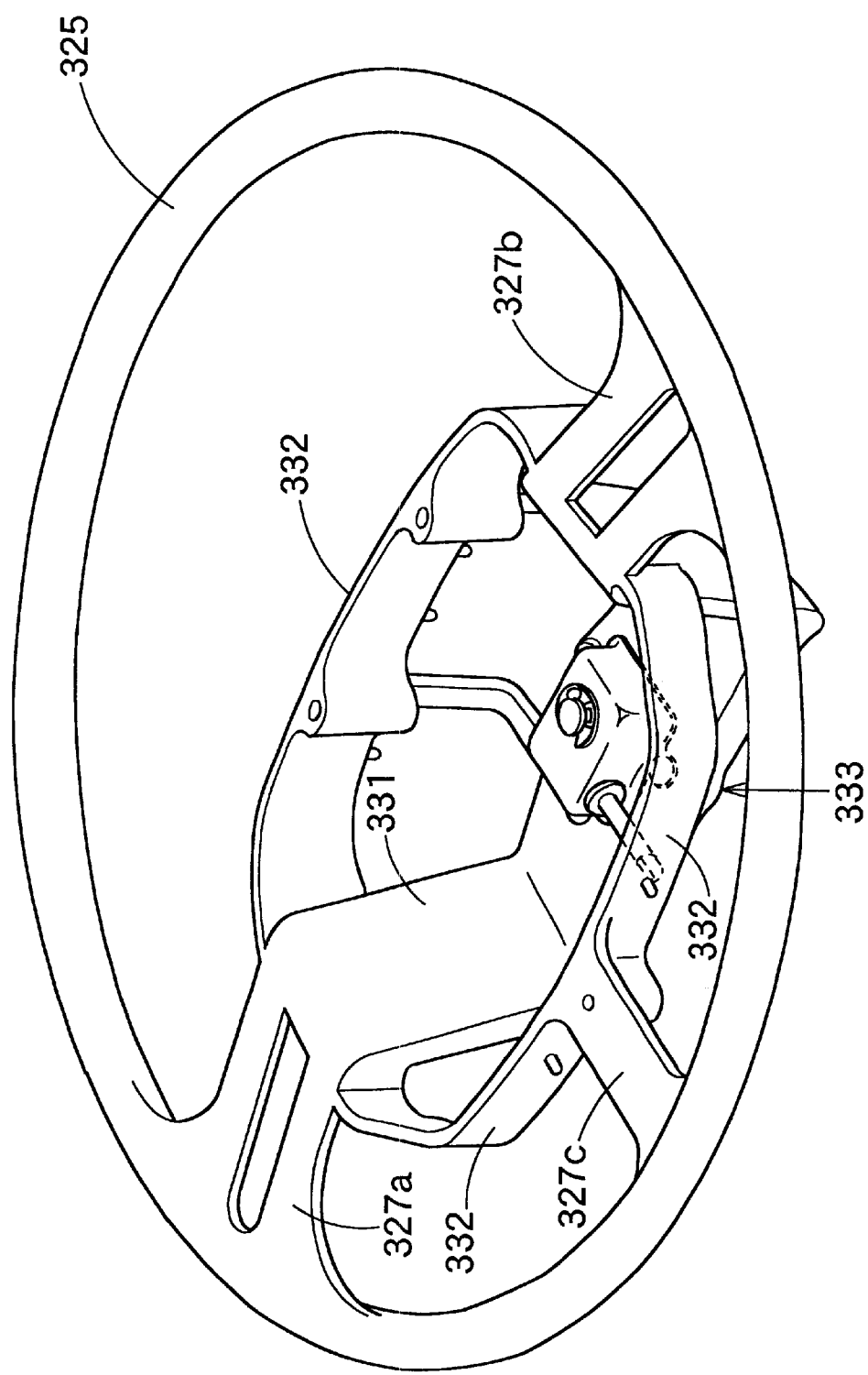
FIG. 32 is a perspective view of a metal core and a boss of the steering wheel shown in FIG. 30.

As shown in FIG. 32, the spoke cores 327a and 327b which are horizontally spaced from each other and make a pair are connected by a main connecting portion 331 of substantially U-shaped cross section and by an annular connecting portion 332. The remaining spoke core 327c on the side of the driver is connected with the spoke cores 327a and 327b via the annular connecting portion 332. The main connecting portion 331 is connected at the center of its bottom to a boss 333. This boss 333 is connected to the front end of the steering shaft 334 via a gear mechanism 335 so that rotary motion of the steering wheel 321 is transmitted to the steering shaft 334 during steering maneuvers.

The steering wheel core that is made of the rim core 325, spoke cores 327a–327c, main connecting portion 331, annular connecting portion 332, and boss 333 is die cast from a light metal such as aluminum, an aluminum alloy, magnesium, or a magnesium alloy. The rim, spoke coatings 326, 328, and pad 323 are integrally formed from a soft synthetic resin such as foamed polyurethane.

A receiving recessed portion 336 surrounded by the spoke coating 328 is formed below the pad 323. An air bag system 337 is mounted in this receiving recessed portion 336. This air bag system 337 comprises an air bag 338 received in a folded state, an inflator 339 for supplying a gas used for inflation into the air bag 338, and a bag holder 340 for holding the air bag 338 and the inflator 339. The bag holder 340 is mounted to the spoke cores 327a–327c with screws 341. A concave tear line 342 is formed on the rear side of the central portion of the cross section of the pad 323. This tear line 342 is torn up by inflation of the air bag 338 when the air bag system 337 is operated.

Figure 33:
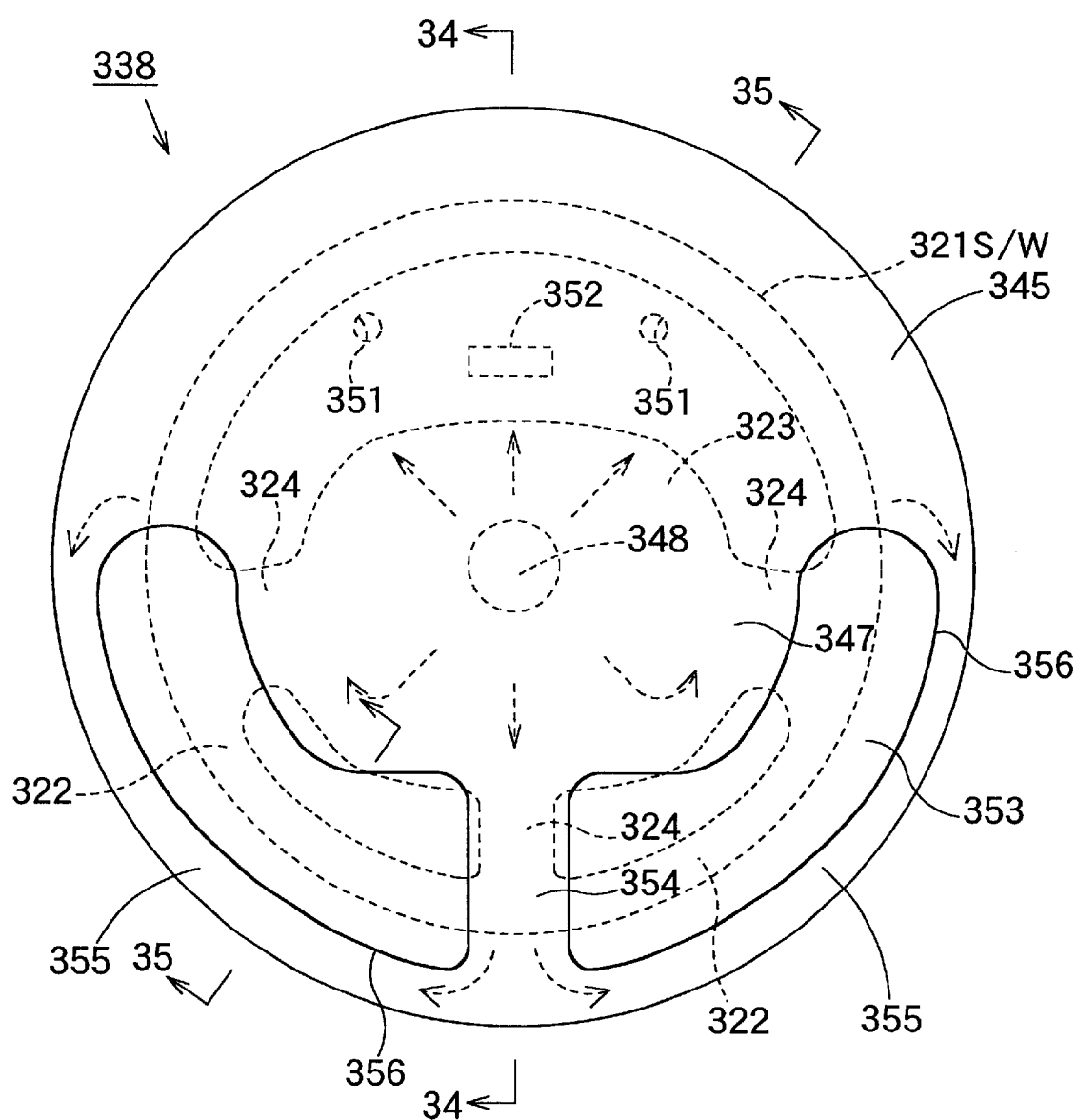
FIG. 33 is a front elevation of the air bag shown in FIG. 30, showing the state in which the air bag is inflated.
Figure 34:
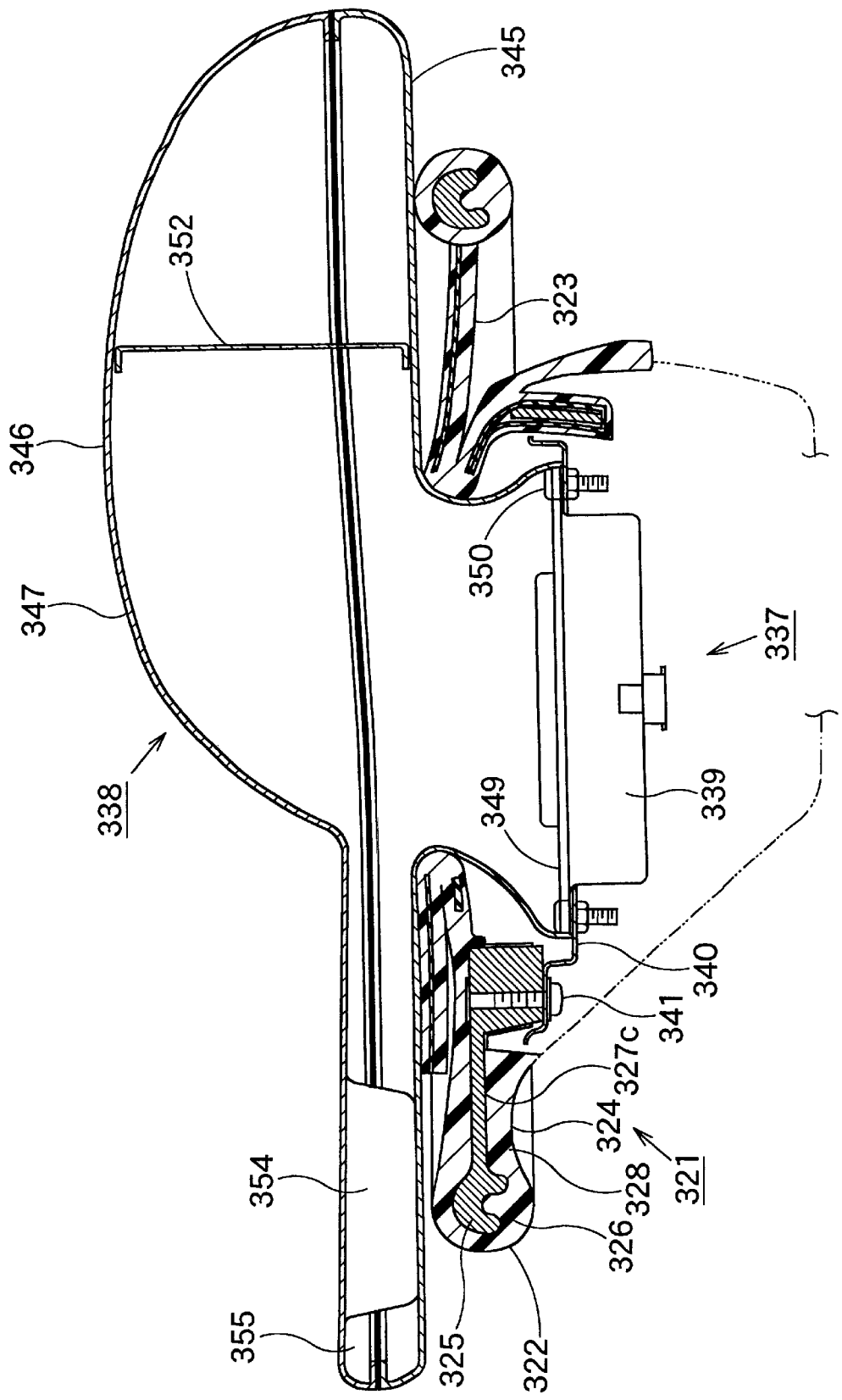
FIG. 34 is a cross-sectional view taken on line 34—34 of FIG. 33.
Figure 35:
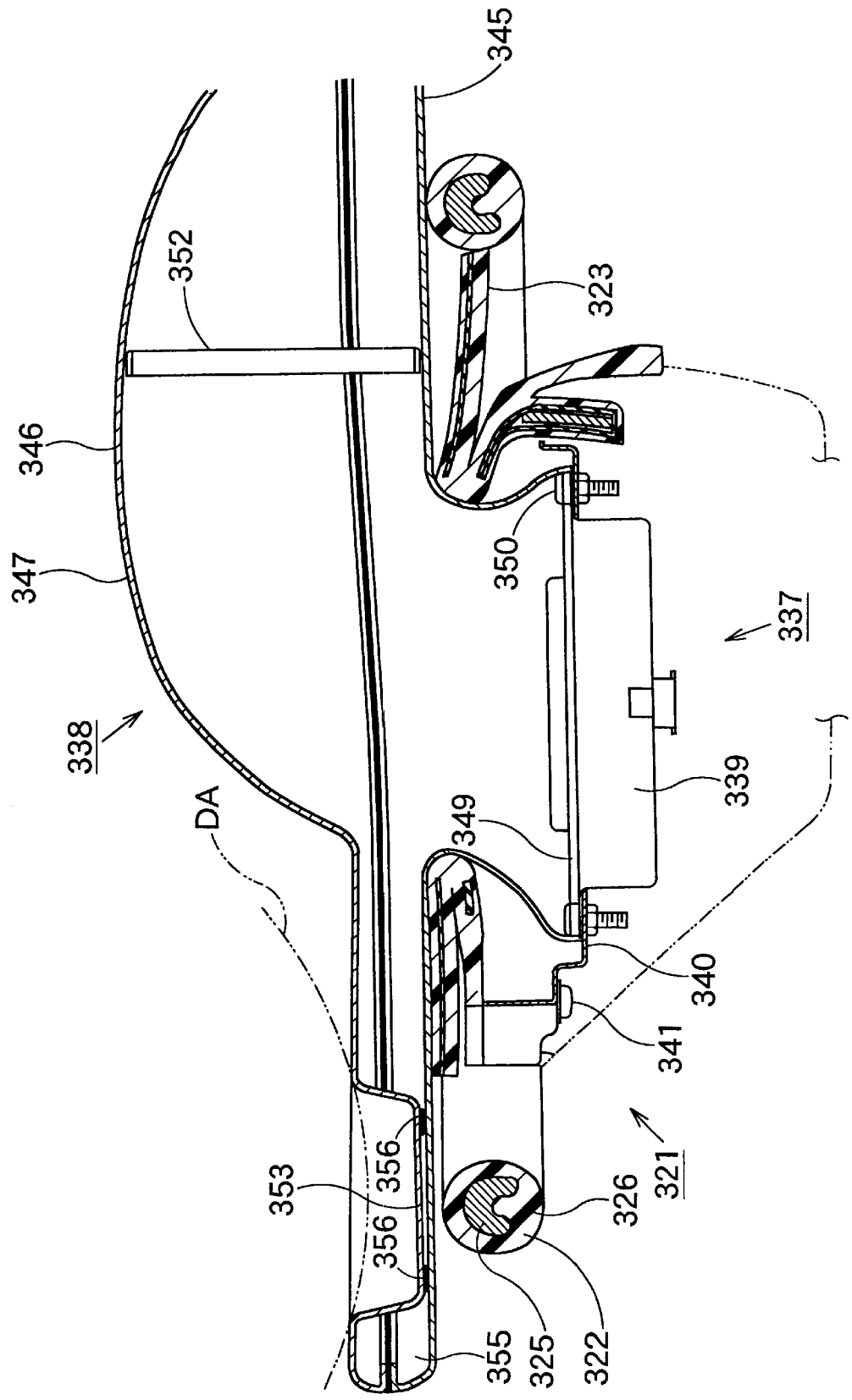
FIG. 35 is a cross-sectional view taken on line 35—35 of FIG. 33.

The aforementioned air bag 338 is next described. As shown in FIGS. 33–35, the air bag 338 comprises base fabric 345 on the front side and counter fabric 346 on the side of the rear panel. The base fabric 345 assumes a circular cross section. The counter fabric 346 is located opposite to the base fabric 345. A main bag portion 347 forming a part of the air bag is formed between both fabrics 345 and 346. These fabrics 345 and 346 are made of fibrous woven fabrics, knitted fabrics, or unwoven fabrics. Examples of the fibers include synthetic fibers (organic fibers) including polyamide fibers, aramid fibers, polyester fibers, vinylon fibers, polyolefin fibers, polyoxymethylene fibers, sulfone fibers, polyetheretherketone fibers, polyimide fibers, and polyetherimide fibers. Other examples are inorganic fibers including carbon fibers, glass fibers, and ceramic fibers. Further examples are cellulose fibers such as cotton and rayon. Still other examples are protein fibers such as silk and wool. These fibers are used alone or in combination, and can be long fibers, short fibers, or blend fibers.

The aforementioned main bag portion 347 is fabricated by sewing together the whole fringes of the fabrics 345 and 346 and then turning the sewn fabrics inside out.

The base fabric 345 is provided with a gas inlet port 348 connected with the inflator 339. During operation of the air bag system 337, gas produced by the inflator 339 is supplied into the main bag portion 347 via the gas inlet port 348. The base fabric 345 is tightened against the bag holder 340 via a retainer 349 at the fringes of the gas inlet port 348 by bolts 350. Plural (two in the present embodiment) gas vent holes 351 are formed above the base fabric 345.

A beltlike tether 352 is sewn at its opposite ends to the upper centers of the base fabric 345 and the counter fabric 346 in the main bag portion 347. The length of this tether 352 determines the thickness (amount of stroke) of the main bag portion 347 during operation of the air bag system 337.

The lower half portion of the air bag 338 has plural (two in the present embodiment) stitching portions 353 along the outer fringes, the stitching portions acting to join together the front and rear sides. These switching portions 353 are sewn to both fabrics 345 and 346 when they are all joined together. These switching portions 353 are so arranged as to correspond to the rim 322 of the steering wheel 321 during operation of the air bag 338.

The presence of the stitching portions 353 makes the amount of stroke of the lower half portion of the air bag less than that of the upper half portion during operation of the air bag system 337. That is, when the gas is supplied into the main bag portion 347 from the inflator 339, the upper half portion of the air bag 338 is inflated to a greater thickness, while the lower half portion is inflated to a smaller thickness.

A passage 354 radially passes through the center of each stitching portion 353 to divide it. The passage 354 is on an extension of a straight line that bisects the main bag portion 347 into right and left portions. During operation of the air bag system 337, the passage 354 circulates the gas toward the outer periphery of the air bag 338, the gas being supplied from the gas inlet port 348. Arc-shaped peripheral portions 355 forming parts of the bag portion are formed between the stitching portions 353 and the outer fringes of the air bag 338. The peripheral bag portions 355 are directly continuous with the main bag portion 347 at their top ends and are continuous with the main bag portion 347 via the radially extending passage 354 at their centers.

Parts of stitching thread 356 forming the fringes of the stitching portions 353 are so sewn that their stitching strength is lower than the other portions. When the pressure of the gas inside the main bag portion 347 and inside the peripheral portions 355 rises above a given value, parts of the stitching thread 356 are unstitched. Consequently, the base fabric 345 and the counter fabric 346 are disengaged from each other in parts of the stitching portions 353, thus increasing the volumes of the bag portions 347 and 355. A part of the gas inside the bag portions 347 and 355 flows into the stitching portions 353. In this way, the stitching portions 353 form volume-varying portions that vary the volumes of the bag portions 347 and 355 when the pressure of the gas inside the bag portions 347 and 355 increases beyond a given value.

The operation of the air bag system 337 is next described. When the vehicular body receives an impact load in excess of a given value, the output signal from an impact sensor (not shown) responding to the impact ignites the inflator 339. A large amount of gas is produced inside the inflator 339. This gas is supplied into the air bag in a folded state via the gas inlet port 348. Inflation of the air bag 338 is started. The air bag 338 that is being inflated abuts against the pad 323, whereby the inflation is suppressed temporarily. The pressure of the gas inside it increases violently. This causes the air bag 338 to push up the pad 323 from inside. When the pushing force of the air bag 338 exceeds a given value, the tear line 342 in the pad 323 is torn. As a result, the air bag 338 is ejected from the pad 323 toward the occupant at a high speed.

Under this condition, there is no obstacle to inflation of the air bag 338. The amount of gas flowing into the air bag 338 from the inflator 339 reaches a maximum value. At this time, the gas flowing into the main bag portion 347 from the gas inlet port 348 is uniformly distributed toward the outer periphery of the main bag portion 347. In FIG. 33, the gas distributed downwardly of the air bag 338 from the gas inlet port 348 passes through the radially extending passage 354 and flows into the peripheral bag portions 355. This quickly inflates the radially extending passage 354 and the peripheral portions 355 existing in the lower half portion of the air bag 338.

In FIG. 33, the gas distributed obliquely downwardly of the air bag 338 from the gas inlet port 348 collides against the stitching portions 353. A part of the gas flows along the fringes of the stitching portions 353 and is guided to the upper half portion of the air bag 338. The gas whose direction of flow is changed along the fringes of the stitching portions 353 cooperates with the gas distributed upwardly of the air bag 338 from the gas inlet port 348 to inflate the upper half portion of the air bag 338.

Then, the air bag 338 inflates into a desired shape having a thick upper half portion and a thin lower half portion (with a small amount of stroke) as shown in FIGS. 34 and 35. Thus, the inflation is completed. At this time, the stitching portions 353 of the air bag 338 that has been inflated correspond to the rim 322 of the steering wheel 321, and the peripheral bag portions 355 are located outside the rim 322. Under this condition, the inflow of the gas from the inflator 339 passes its peak and begins to decrease. In this state, as indicated by the phantom line in FIG. 35, the occupant's abdomen DA begins to touch the radially extending passage 354 and the peripheral portions 355 of the lower half portion of the fully inflated air bag 338.

The recessed portion corresponding to the stitching portions 353 and surrounded by the main bag portion 347, the peripheral portions 355, and the radially extending passage 354 have a sufficient depth. Their corners have a curvature greater than that of the abdomen DA of the occupant that enters the bag. Therefore, the occupant's abdomen DA is held by the fringes of the top surfaces of the recessed portions. Contact of the occupant's abdomen DA with the rim 322 of the steering wheel 321 via the stitching portions 353 is suppressed.

Then, the occupant makes inroads into the main bag portion 347, the peripheral portions 355, and the radially extending passage 354 because of the force of inertia. Then, the occupant receives a deceleration because of the reaction from the air bag 338. The inroads of the occupant increases the pressure of the gas inside the bag portions 347 and 355. A part of the gas inside the main bag portion 347 is vented to the outside of the air bag 338 through the gas vent holes 351, through the interface between the fabrics 345 and 346, and through the stitches of the fabrics 345, 346.

When the pressure of the gas inside both bag portions 347 and 355 increases beyond a given value, the switching thread 356 of the stitching portions 353 is partially unstitched. The volumes of the bag portions 347 and 355 are increased. In consequence, the pressure of the gas inside the bag portions 347 and 355 decreases. As a result, the deceleration that the occupant undergoes decreases gradually until a given value is reached and thus the occupant is restrained (protected).

Accordingly, the present embodiment yields the following advantages.

(a) This air bag 338 has the stitching portions 353 in its lower half portion to join together the base fabric 345 and the counter fabric 346. Furthermore, the radially extending passage 354 is provided to bisect the stitching portions 353 while permitting flow of the gas toward the outer periphery of the main bag portion 347.

Therefore, the presence of the stitching portions 353 limits the thickness (amount of stroke) of the lower half portion of the air bag 338 during inflation of the air bag 338. Also, the volume of the main bag portion 347 in the lower half portion is reduced. It is to be noted that the occupant makes inroads into the lower half portion of the air bag 338 to a lesser extent than the upper half portion and hence the lower half portion needs a less amount of stroke.

When the air bag 338 inflates, the radially extending passage 354 in the lower half portion quickly inflates into a hollow cylinder. This quickly secures the desired amount of stroke in the lower half portion. The flow of gas which is supplied into the main bag portion 347 from the gas inlet port 348 and collides against the stitching portions 353 is redirected upward within the main bag portion 347. This enhances the inflation speed of the upper half portion of the air bag 338.

Therefore, the air bag 338 is inflated into a desired shape in a shorter time. The inflated air bag 338 can be quickly inserted between the intruding occupant and the steering wheel 321. Unlike the above-described structure, upward movement of the air bag 338 is suppressed when the occupant is forced into the air bag. The air bag 338 can be inflated in a desired position in a stable state.

Furthermore, the whole volume of the air bag 338 is reduced and so the output power of the inflator 339 for supplying the gas into the air bag 338 can be reduced. Consequently, the cost to fabricate the air bag system 337 in which the air bag 338 is mounted can be reduced.

(b) In this air bag 338, the peripheral portions 355 that are continuous with the main bag portion 347 directly and via the radially extending passage 354 are formed outside the stitching portions 353. For this reason, the peripheral portions 355 quickly inflate into a hollow cylinder together with the radially extending passage 354. Accordingly, a desired amount of stroke can be easily secured in the lower half portion of the air bag 338.

(c) This air bag 338 is mounted in the vehicular steering wheel 321. The stitching portions 353 are so positioned as to correspond to the rim 322 of the steering wheel 321 during operation.

Therefore, when the air bag 338 is inflated and the occupant is pushed into the air bag 338, the occupant first touches the peripheral portions 355. Then, he or she enters the air bag 338 while pushing the peripheral portions 355, the radially extending passage 354, and the main bag portion 347. During this initial phase of inflation, the peripheral bag portions 355 are pushed against the steering wheel 321 and, therefore, the rim 322 of the steering wheel 321 is received in the recessed portion that is shaped to correspond to the stitching portions 353 by inflation of the main bag portion 347 and the peripheral portions 355. This brings the rim 322 into engagement with the peripheral portions 355, thus effectively suppressing upward movement of the air bag 338. As a consequence, the air bag 338 can be inflated in a desired position in a stable state.

(d) In this air bag 338, the radially extending passage 354 is formed on an extension to a straight line that intersects the main bag portion 347 into right and left portions. Therefore, during operation of the air bag 338, the radially extending passage 354 that has been inflated is placed opposite to vicinities of the center of the occupant. This assures that this inflated, radially extending passage 354 is inserted between the occupant and the steering wheel 321.

(e) In this air bag 338, parts of the stitching thread 356 forming the fringes of the stitching portions 353 have a stitching strength weaker than that of the other portions. During operation of the air bag 338, when the occupant is forced into the bag and the pressure of the gas inside the main bag portion 347 and the peripheral portions 355 increases beyond a given value, the stitching thread 356 is partially unstitched.

Consequently, in the stitching portions 353, the base fabric 345 and the counter fabric 346 disengage from each other, creating a new space for accepting the gas. This increases the volumes of both bag portions 347 and 355, leading to a decrease in the pressure of the gas inside both bag portions 347 and 355. Hence, the energy can be absorbed appropriately.

(f) In this air bag 338, the base fabric 345 and the counter fabric 346 are sewn together after they have been joined together. Thus, they are integrated as the stitching portion 353.

Therefore, when the air bag 338 is shaped, the stitching portion 353 for coupling together the front and rear portions can be easily and economically fabricated by sewing both fabrics 345 and 346 directly to the air bag 338. When both fabrics 345 and 346 are sewn, the pressure leading to an increase in the volumes of the main bag portion 347 and the peripheral portions 355 can be readily controlled by varying the stitching strength of the stitching thread 356.

In the present embodiment, the stitching portions 353 stitch together only the surroundings of the joining portions that join together the front and rear portions. The inside of the joining portions may also be stitched. In addition, the joining portions 353 may be formed by adhesive bonding or other method.

A modification of the fourth embodiment is next described. The following description centers on the differences with the above-described embodiment.

Figure 36:
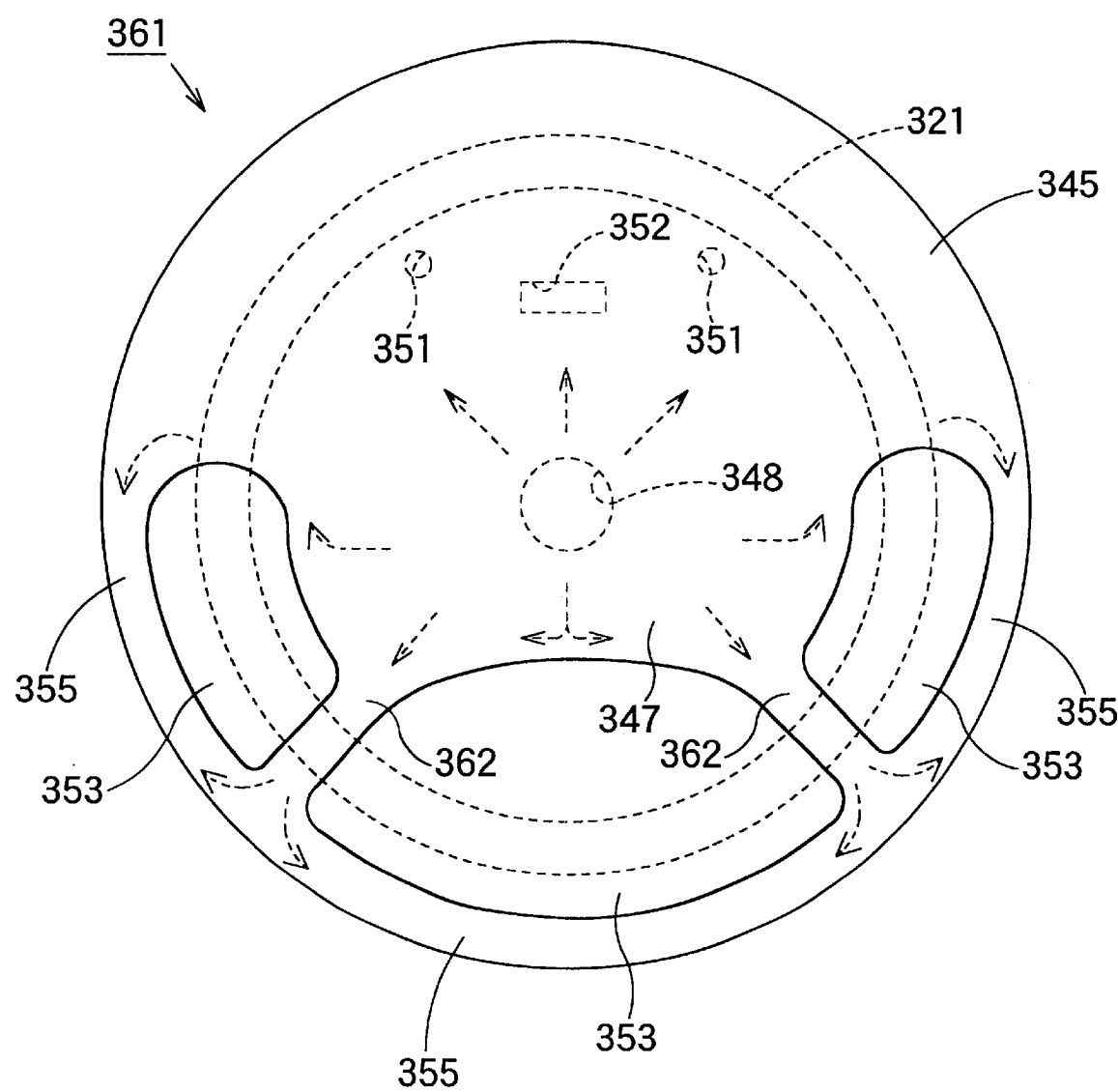
FIG. 36 is a front elevation of an air bag in accordance with a modification of the fourth embodiment, showing the state in which the air bag is inflated.

As shown in FIG. 36, the air bag in accordance with this modified embodiment is generally indicated by reference numeral 361 and has a switching portion 353 that is divided into three portions by two passages 362. In the illustrated example, the passages 362 extend obliquely downward.

Accordingly, the present embodiment yields the following advantages as well as the advantages (a)–(c), (e), and (f) of the fourth embodiment described above.

(g) This air bag 361 has the two passages 362 for guiding the gas into the peripheral portions 355. Therefore, the gas can be quickly guided by the peripheral portions 355. The inflation speed of the peripheral portions 355 can be improved.

Another modification of the fourth embodiment is described. The following description centers on the differences with the embodiments described above.

Figure 37:
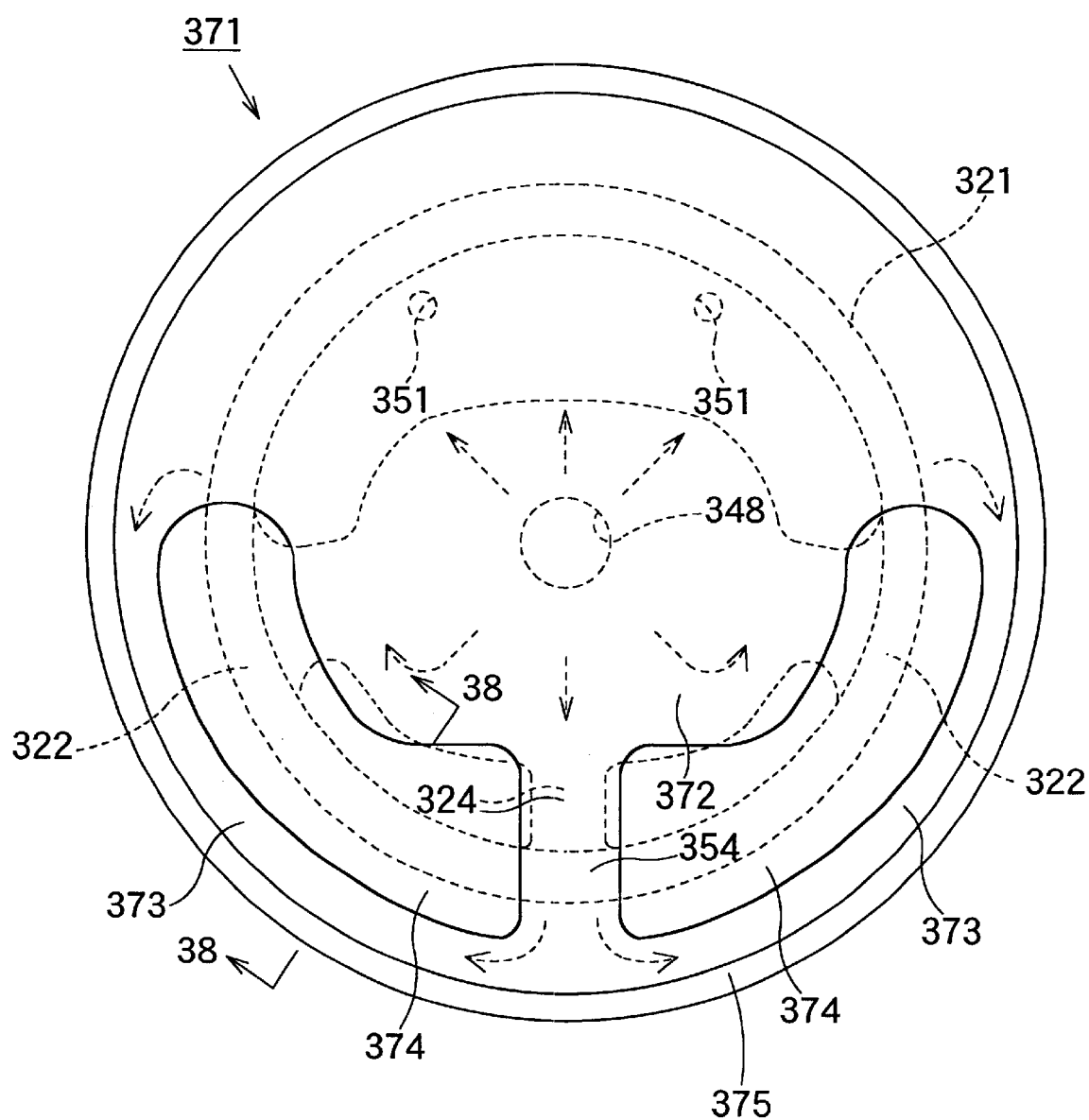
FIG. 37 is a front elevation of an air bag in accordance with another modification of the fourth embodiment, showing the state in which the air bag is inflated.
Figure 38:
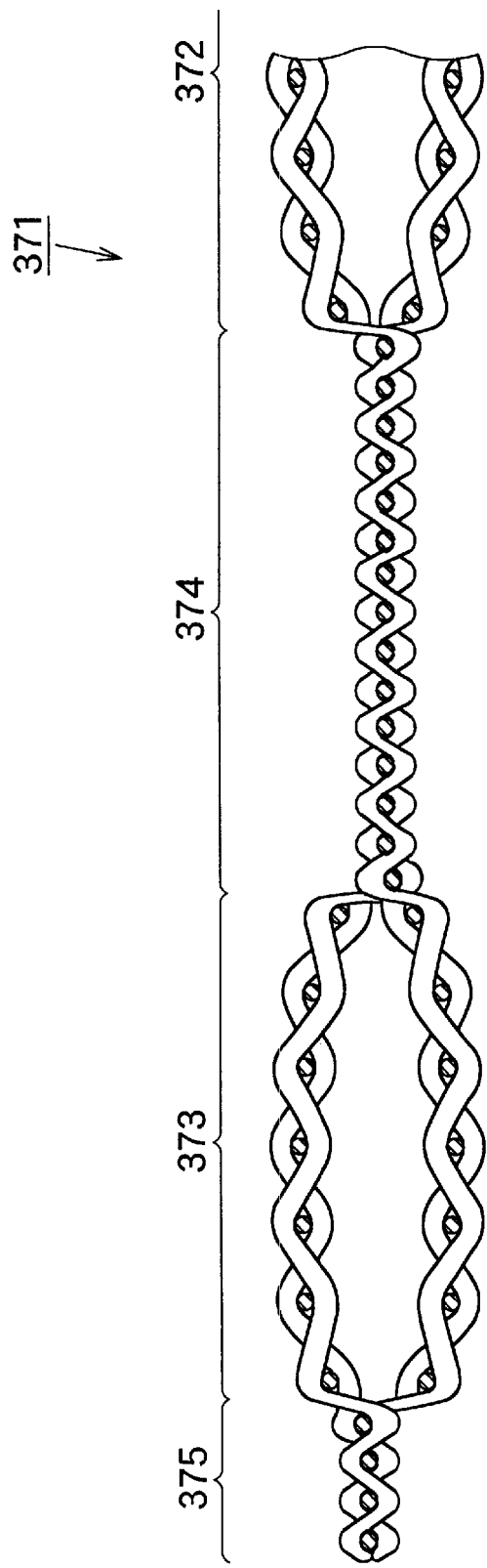
FIG. 38 is a cross-sectional view taken on line 38—38 of FIG. 37.

As shown in FIGS. 37 and 38, an air bag in accordance with this modified embodiment is generally indicated by reference numeral 371 and has a main bag portion 372, peripheral bag portions 373, and an intervening single-woven inner portion 374 that is a joining portion for joining together the front and rear sides. These portions are integrated into one by a hollow weave. A single-woven outer portion 375 is formed around the fringes of the air bag 371. In both bag portions 372 and 373, the base fabric 345 and the counter fabric 346 form a double bag structure. On the other hand, the aforementioned single-woven portions 374 and 375 are connecting bands that are structurally continuous with the double-woven portions. In this case, the tether 352 of the main bag portion 372 is omitted.

Accordingly, the present embodiment yields the following advantages in addition to the advantages (a)–(d) of the above-described embodiments.

(h) In this air bag 371, the main bag portion 372 and the peripheral bag portions 373 are fabricated by hollow weave. Therefore, during fabrication of the air bag 371, both bag portions 372, 373 and the single-woven inner portion 374 for joining together the front and rear sides can be formed at the same time. Consequently, the number of process steps for fabricating the air bag 371 can be reduced. The air bag 371 can be fabricated at low cost.

The fourth embodiment and its modifications may be further modified and embodied as follows.

(i) The number of the radially extending passages 354 or 362 may be different from the number used in the above-described embodiments. That is, the number may be two, three, or more.

(ii) In the above-described embodiments and its first modification, the tether 352 of the main bag portion 347 may be omitted. In this structure, the number of process steps for fabricating the air bags 338 and 361 can be reduced. In consequence, the air bags 338 and 361 can be fabricated at lower cost.

(iii) In the second embodiment, the base fabric 345 and the counter fabric 346 of the main bag portion 372 may be connected together by the tether 352. In this structure, the amount of stroke of the main bag portion 372 can be controlled more accurately.

While a number of embodiments and modifications have been described and illustrated, the invention is not to be limited thereby but by the scope of the following claims.

What is claimed is:

1. An air bag mounted in a steering wheel and used to protect an occupant seated in front of said steering wheel, said air bag comprising:

a bag body having a front panel portion and a rear panel portion located opposite to said front panel portion, said front panel portion being provided with a gas inlet port, said bag body assuming a substantially curved contour in a plane as viewed from a side of said occupant when inflation of said air bag is completed;

flow regulation fabric placed opposite to said gas inlet port within said bag body;

said flow regulation fabric branching into a pair of radially extending passages, which are spaced apart from each other, said passages extending to outer fringes of said bag body; and a pair of circumferentially extending passages formed by said flow regulation fabrics, wherein the circumferentially extending passages are spaced apart from each other and extend vertically from front ends of said radially extending passages along fringes of said bag body, each of said circumferentially extending passages having an upper opening end and a lower opening end in positions at which gas can be ejected toward a vertical line that passes through the center of said bag body.

2. An air bag mounted in a steering wheel as set forth in claim 1, wherein said panels are so shaped that when inflation is completed, a vertical cross-sectional shape of the upper portion of said bag body is thicker than a vertical cross-sectional shape of said lower portion.

3. An air bag mounted in a steering wheel as set forth in claim 2, wherein said upper opening end has a diameter greater than that of said lower opening end.

* * * * *